US012149405B2

(12) United States Patent
Yu et al.

(10) Patent No.: US 12,149,405 B2
(45) Date of Patent: Nov. 19, 2024

(54) CONFIGURATIONS ASSOCIATED WITH SEGMENTATION OF ONE OR MORE PACKETS FOR WIRELESS COMMUNICATION

(71) Applicant: QUALCOMM Incorporated, San Diego, CA (US)

(72) Inventors: Yu-Ting Yu, San Francisco, CA (US); Gavin Bernard Horn, La Jolla, CA (US); Anurag Vardhan, San Diego, CA (US); Rotem Cooper, San Diego, CA (US); Aziz Gholmieh, Del Mar, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/531,650

(22) Filed: Nov. 19, 2021

(65) Prior Publication Data

US 2022/0141087 A1    May 5, 2022

Related U.S. Application Data

(62) Division of application No. 15/256,375, filed on Sep. 2, 2016, now Pat. No. 11,201,780.

(Continued)

(51) Int. Cl.
*H04L 41/0803* (2022.01)
*H04L 1/00* (2006.01)
(Continued)

(52) U.S. Cl.
CPC ........ *H04L 41/0803* (2013.01); *H04L 1/0083* (2013.01); *H04L 1/009* (2013.01);
(Continued)

(58) Field of Classification Search
CPC . H04L 1/1867; H04L 1/1896; H04L 41/0803; H04L 1/009; H04L 47/365;
(Continued)

(56) References Cited

U.S. PATENT DOCUMENTS 6,963,751 B1 * 11/2005 Kordsmeyer ..... H04M 1/72505
455/450
7,933,292 B2 * 4/2011 Lee ........................ H04W 72/21
370/349

(Continued)

FOREIGN PATENT DOCUMENTS

CN     201352855 Y    11/2009
CN     201504242 U    6/2010
(Continued)

OTHER PUBLICATIONS

International Search Report and Written Opinion—PCT/US2017/014438—ISA/EPO—Jul. 17, 2017.

(Continued)

*Primary Examiner* — Oussama Roudani
(74) *Attorney, Agent, or Firm* — Loza & Loza, LLP

(57) ABSTRACT

Some aspects provide for establishing a radio connection for the wireless communication, determining a configuration for whether to segment one or more packets for the wireless communication using the established radio connection, and communicating the one or more packets based on the determined configuration. Some aspects provide for assembling a first frame comprising one or more packets, transmitting the first frame, determining whether a portion of one or more packets was truncated during the assembling of the first frame, and transmitting a second frame comprising at least the truncated portion of the one or more packets of the first frame. Some aspects provide for receiving a first frame comprising one or more packets, determining that a portion of one or more packets is truncated, and determining (Continued)

whether to ignore as padding at least the truncated portion of the one or more packets of the first frame.

25 Claims, 19 Drawing Sheets

Related U.S. Application Data

(60) Provisional application No. 62/289,055, filed on Jan. 29, 2016.

(51) Int. Cl.
*H04L 1/1867* (2023.01)
*H04L 47/36* (2022.01)
*H04W 28/06* (2009.01)
*H04W 76/27* (2018.01)

(52) U.S. Cl.
CPC ......... *H04L 47/365* (2013.01); *H04W 28/065* (2013.01); *H04W 76/27* (2018.02); *H04L 1/1867* (2013.01)

(58) Field of Classification Search
CPC .. H04L 1/0083; H04W 12/02; H04W 28/065; H04W 76/27; H04W 6/27
See application file for complete search history.

(56) References Cited

U.S. PATENT DOCUMENTS

| | | | |
|---|---|---|---|
| 9,106,887 B1 | 8/2015 | Owen | |
| 2001/0033582 A1 | 10/2001 | Sarkkinen et al. | |
| 2005/0089000 A1* | 4/2005 | Bae | H04L 67/04 370/349 |
| 2006/0077892 A1* | 4/2006 | Jiang | H04W 99/00 370/229 |
| 2006/0245452 A1* | 11/2006 | Frederiksen | H04W 28/06 370/470 |
| 2009/0046626 A1* | 2/2009 | Shao | H04L 49/9094 370/320 |
| 2009/0046631 A1 | 2/2009 | Meylan et al. | |
| 2009/0086708 A1 | 4/2009 | Pani et al. | |
| 2009/0149189 A1 | 6/2009 | Sammour et al. | |
| 2009/0168770 A1* | 7/2009 | Mohanty | H04L 47/50 370/389 |
| 2009/0252179 A1 | 10/2009 | Sultan et al. | |
| 2009/0252182 A1* | 10/2009 | Maheshwari | H04W 28/06 370/474 |
| 2010/0232356 A1* | 9/2010 | Maheshwari | H04L 1/1896 370/328 |
| 2011/0261814 A1 | 10/2011 | Matthews et al. | |
| 2012/0176971 A1* | 7/2012 | Pani | H04L 47/34 370/328 |
| 2012/0275399 A1 | 11/2012 | Liu et al. | |
| 2012/0320772 A1* | 12/2012 | Frederiks | H04L 47/10 370/252 |
| 2013/0100939 A1* | 4/2013 | Kim | H04L 1/1854 370/336 |
| 2013/0294379 A1 | 11/2013 | Guo et al. | |
| 2014/0092770 A1* | 4/2014 | Terry | H04W 24/00 370/252 |
| 2014/0369194 A1 | 12/2014 | Friedman et al. | |
| 2015/0237528 A1 | 8/2015 | Terry et al. | |
| 2015/0372896 A1* | 12/2015 | Poole | H04L 49/90 370/412 |
| 2016/0285767 A1* | 9/2016 | Brandeburg | H04L 47/36 |
| 2016/0380922 A1* | 12/2016 | Gross, IV | H04L 47/31 370/392 |
| 2017/0222871 A1 | 8/2017 | Yu et al. | |
| 2018/0191551 A1 | 7/2018 | Chun | |

FOREIGN PATENT DOCUMENTS

| | | |
|---|---|---|
| CN | 104243346 A | 12/2014 |
| EP | 3395029 A1 | 10/2018 |
| WO | 2009124082 A1 | 10/2009 |
| WO | 2010107708 A2 | 9/2010 |
| WO | 2018082033 A1 | 5/2018 |

OTHER PUBLICATIONS

Partial International Search Report—PCT/US2017/014438—ISA/EPO—Apr. 25, 2017.
European Search Report—EP23159499—Search Authority—the Hague—May 19, 2023.

\* cited by examiner

CONFIGURATIONS ASSOCIATED WITH SEGMENTATION OF ONE OR MORE PACKETS FOR WIRELESS COMMUNICATION

RELATED APPLICATION

This application is a Divisional Application of U.S. Non-Provisional application Ser. No. 15/256,375 filed on Sep. 2, 2016. Application Ser. No. 15/256,375 claims priority under 35 U.S.C. § 119(e) to U.S. Provisional Application No. 62/289,055 filed on Jan. 29, 2016, the entire specification of which is incorporated herein by reference.

TECHNICAL FIELD

Aspects of the present disclosure relate, generally, to wireless communication systems and, more particularly, to configurations associated with segmentation of one or more packets for wireless communication.

BACKGROUND

Wireless communication networks are widely deployed to provide various communication services such as telephony, video, data, messaging, broadcasts, and so on. Such networks, which are usually multiple access networks, support communications for multiple users by sharing the available network resources. Within such wireless networks a variety of data services may be provided, including voice, video, and emails. The spectrum allocated to such wireless communication networks can include licensed spectrum and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. As the demand for mobile broadband access continues to increase, research and development continue to advance wireless communication technologies to meet the growing demand for mobile broadband access and to enhance the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides a method for wireless communication. In some configurations, the method may include establishing a radio connection for the wireless communication, determining a configuration for whether to segment one or more packets for the wireless communication using the established radio connection, and communicating the one or more packets based on the determined configuration. In some configurations, the method may include assembling a first frame comprising one or more packets, transmitting the first frame, determining whether a portion of one or more packets was truncated during the assembling or transmitting of the first frame, and transmitting a second frame comprising at least the truncated portion of the one or more packets of the first frame. In some configurations, the method may include receiving a first frame comprising one or more packets, determining that a portion of one or more packets is truncated, and determining whether to ignore as padding at least the truncated portion of the one or more packets of the first frame. In some configurations, the method may include determining whether to select between a segmentation-free operation and a segmentation-allowed operation and communicating an indication to a peer entity, wherein the indication includes information associated with the determination.

In another aspect, the present disclosure provides an apparatus for wireless communication. The apparatus includes a transceiver, a memory, and at least one processor communicatively coupled to the transceiver and the memory. In some configurations, the at least one processor and the memory may be configured to establish a radio connection for the wireless communication, determine a configuration for whether to segment one or more packets for the wireless communication using the established radio connection, and communicate the one or more packets based on the determined configuration. In some configurations, the at least one processor and the memory may be configured to assemble a first frame comprising one or more packets, transmit the first frame, determine whether a portion of one or more packets was truncated during the assembling or transmitting of the first frame, and transmit a second frame comprising at least the truncated portion of the one or more packets of the first frame. In some configurations, the at least one processor and the memory may be configured to receive a first frame comprising one or more packets, determine that a portion of one or more packets is truncated, and determine whether to ignore as padding at least the truncated portion of the one or more packets of the first frame. In some configurations, the at least one processor and the memory may be configured to determine whether to select between a segmentation-free operation and a segmentation-allowed operation and communicate an indication to a peer entity, wherein the indication includes information associated with the determination.

In yet another aspect, the present disclosure provides a computer-readable medium storing computer-executable code, and the computer-executable code may include various instructions. In some configurations, the instructions may be configured to establish a radio connection for the wireless communication, determine a configuration for whether to segment one or more packets for the wireless communication using the established radio connection, and communicate the one or more packets based on the determined configuration. In some configurations, the instructions may be configured to assemble a first frame comprising one or more packets, transmit the first frame, determine whether a portion of one or more packets was truncated during the assembling or transmitting of the first frame, and transmit a second frame comprising at least the truncated portion of the one or more packets of the first frame. In some configurations, the instructions may be configured to receive a first frame comprising one or more packets, determine that a portion of one or more packets is truncated, and determine whether to ignore as padding at least the truncated portion of the one or more packets of the first frame. In some configurations, the instructions may be configured to determine whether to select between a segmentation-free operation and a segmentation-allowed operation and communicate an indication to a peer entity, wherein the indication includes information associated with the determination.

In a further aspect of the present disclosure, the present disclosure provides an apparatus for wireless communication. In some configurations, the apparatus may include means for establishing a radio connection for the wireless communication, means for determining a configuration for whether to segment one or more packets for the wireless communication using the established radio connection, and means for communicating the one or more packets based on the determined configuration. In some configurations, the apparatus may include means for assembling a first frame comprising one or more packets, means for transmitting the first frame, means for determining whether a portion of one or more packets was truncated during the assembling or transmitting of the first frame, and means for transmitting a second frame comprising at least the truncated portion of the one or more packets of the first frame. In some configurations, the apparatus may include means for receiving a first frame comprising one or more packets, means for determining that a portion of one or more packets is truncated, and means for determining whether to ignore as padding at least the truncated portion of the one or more packets of the first frame. In some configurations, the apparatus may include means for determining whether to select between a segmentation-free operation and a segmentation-allowed operation and means for communicating an indication to a peer entity, wherein the indication includes information associated with the determination.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, certain structures and components are shown in block diagram form in order to avoid obscuring such concepts.

The concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others). One of ordinary skill in the art will understand that the aspects described herein may be implemented in various technologies without deviating from the scope of the present disclosure.

Figure 1:
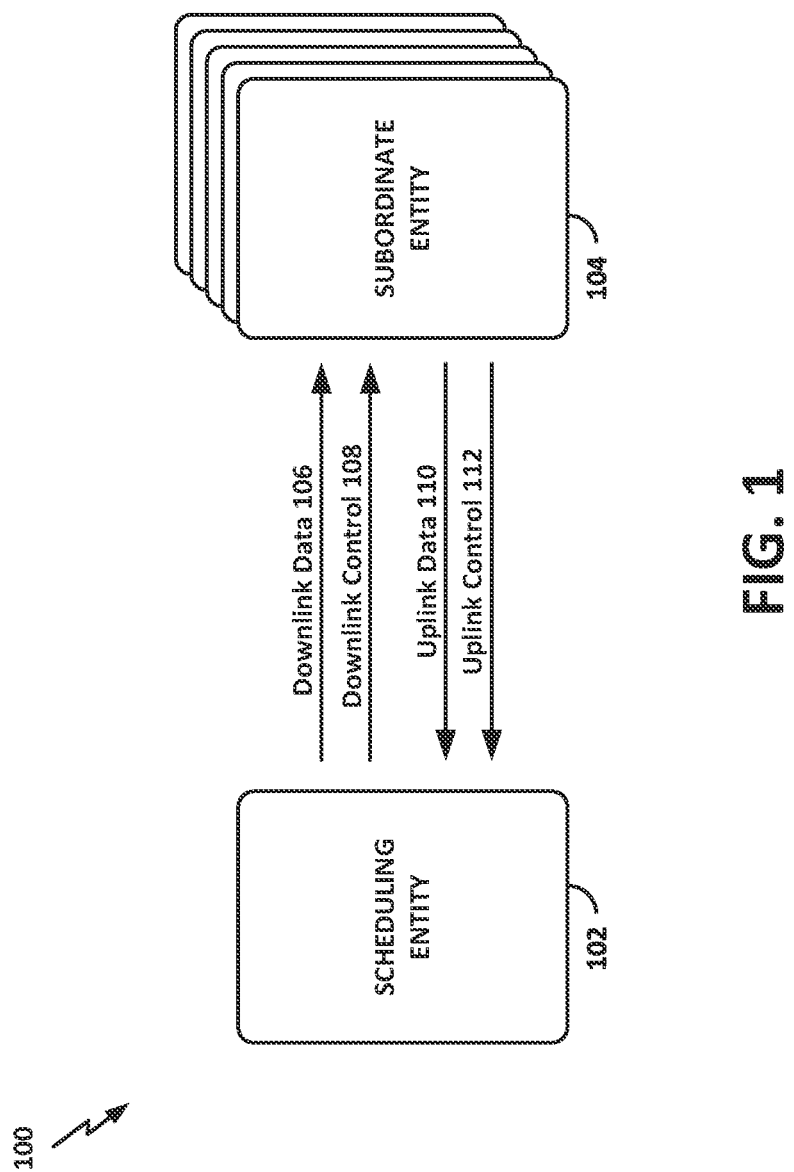
FIG. 1 is a diagram illustrating an example of various communications between a scheduling entity and one or more subordinate entities according to aspects of the present disclosure.

FIG. 1 is a diagram 100 illustrating an example of various communications between a scheduling entity 102 and one or more subordinate entities 104 according to aspects of the present disclosure. Broadly, the scheduling entity 102 is a node or device responsible for scheduling traffic in a wireless communication network, including various downlink (DL) and uplink (UL) transmissions. The scheduling entity 102 may sometimes be referred to as a scheduler, and/or any other suitable term without deviating from the scope of the present disclosure. The scheduling entity 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, the subordinate entity 104 is a node or device that receives scheduling and/or control information, including but not limited to scheduling grants, synchronization or timing information, or other control information from another entity in the wireless communication network, such as the scheduling entity 102. The subordinate entity 104 may be a referred to as a schedulee, and/or any other suitable term without deviating from the scope of the present disclosure. The subordinate entity 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

As used herein, 'control channel(s)' may sometimes be used to communicate grant information. The scheduling entity 102 may transmit DL data channel(s) 106 and DL control channel(s) 108. The subordinate entity 104 may transmit UL data channel(s) 110 and UL control channel(s) 112. The channels illustrated in FIG. 1 are not necessarily all of the channels that may be utilized by the scheduling entity 102 and/or the subordinate entity 104. Those of ordinary skill in the art will recognize that other channels may be utilized in addition to those illustrated, such as other data, control, and feedback channels. As used herein, the term 'downlink' or 'DL' may refer to a point-to-multipoint transmission originating at the scheduling entity 102, and the term 'uplink' or 'UL' may refer to a point-to-point transmission originating at the subordinate entity 104. According to aspects of the present disclosure, the term(s) 'communicate' and/or 'communicating' refer to transmission and/or reception. One of ordinary skill in the art will understand that many types of technologies may perform such communication without deviating from the scope of the present disclosure. As used herein, the term 'DL-centric time-division duplex (TDD) subframe' refers to a TDD subframe in which a substantial proportion (e.g., majority) of the information is communicated in the DL direction, even though some of the information may be communicated in the UL direction. Also, the term 'UL-centric TDD subframe' refers to a TDD subframe in which a substantial proportion (e.g., majority) of the information is communicated in the UL direction, even though some information may be communicated in the DL direction.

Figure 2:
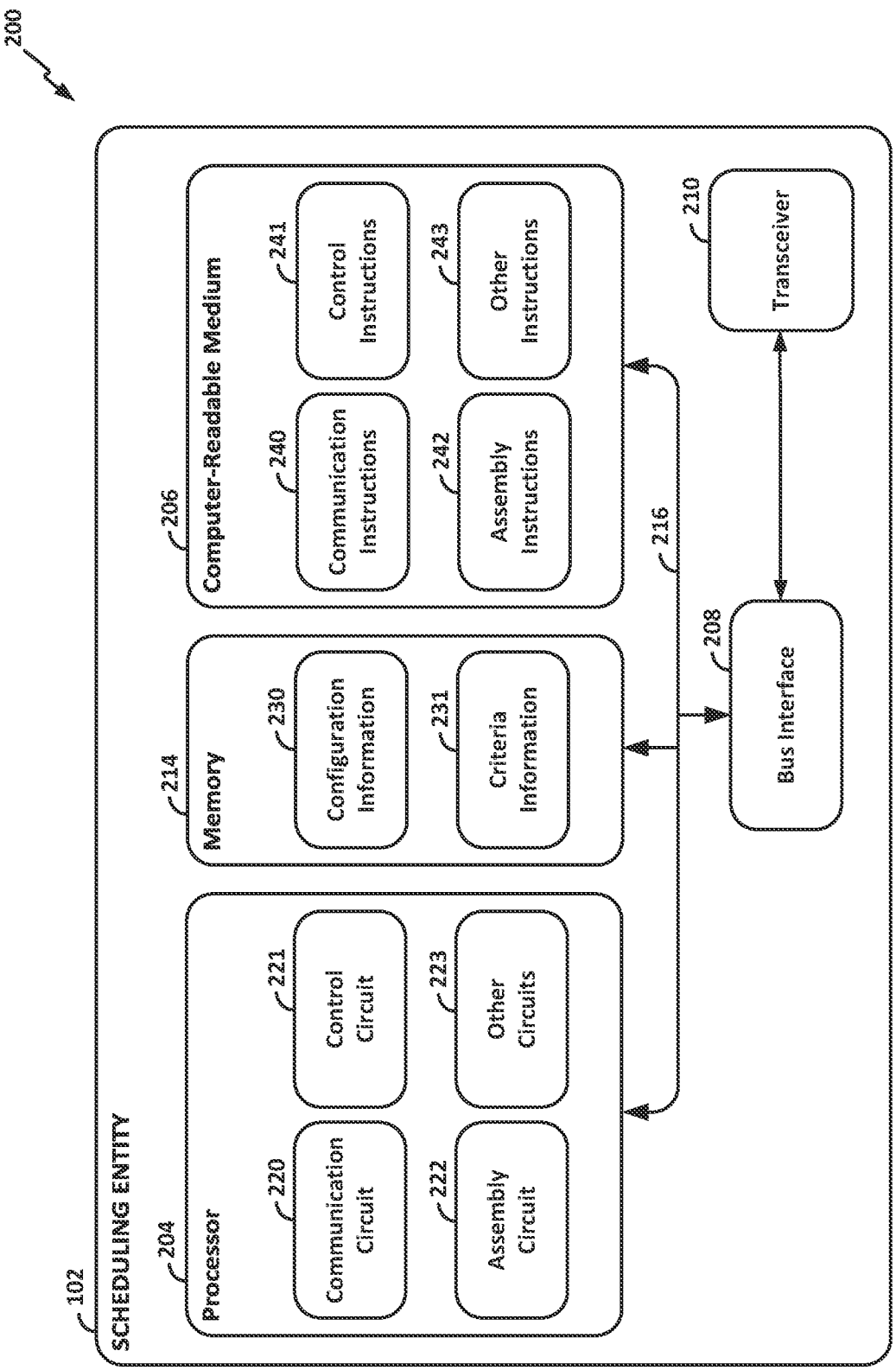
FIG. 2 is a diagram illustrating an example of a hardware implementation of a scheduling entity according to aspects of the present disclosure.

FIG. 2 is a diagram 200 illustrating an example of a hardware implementation of the scheduling entity 102 according to various aspects of the present disclosure. The scheduling entity 102 may include a transceiver 210. The transceiver 210 may be configured to receive data and/or transmit data in communication with another apparatus. The transceiver 210 provides a means for communicating with another apparatus via a wired or wireless transmission medium. The transceiver 210 may be configured to perform such communications using various types of technologies without deviating from the scope of the present disclosure.

The scheduling entity 102 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may include a communication circuit 220, a control circuit 221, an assembly circuit 222, and/or other circuits 223. In some configurations, such circuits 220-223 may individually or in some combination include various hardware components and/or may perform various algorithms that provide the means for establishing a radio connection for the wireless communication, means for determining a configuration for whether to segment one or more packets for the wireless communication using the established radio connection, and/or means for communicating the one or more packets based on the determined configuration. In some configurations, such circuits 220-223 may individually or in some combination include various hardware components and/or may perform various algorithms that provide the means for assembling a first frame comprising one or more packets, means for transmitting the first frame, means for determining whether a portion of one or more packets was truncated during the assembling or transmitting of the first frame, and/or means for transmitting a second frame comprising at least the truncated portion of the one or more packets of the first frame. In some configurations, such circuits 220-223 may individually or in some combination include various hardware components and/or may perform various algorithms that provide the means for receiving a first frame comprising one or more packets, means for determining that a portion of one or more packets is truncated, means for determining whether to ignore as padding at least the truncated portion of the one or more packets of the first frame, and/or means for receiving a second frame comprising at least the truncated portion of the one or more packets of the first frame.

The foregoing description provides a non-limiting example of the processor 204 of the scheduling entity 102. Although various circuits 220, 221, 222 are described above, one of ordinary skill in the art will understand that the processor 204 may also include various other circuits 223 that are in addition and/or alternative(s) to the aforementioned circuits 220, 221, 222. Such other circuits 223 may provide the means for performing any one or more of the functions, methods, processes, features and/or aspects described herein.

The computer-readable medium 206 may store computer-executable code, and the computer-executable code may include various instructions configured to perform various functions and/or enable various aspects described herein. The computer-executable code may be executed by various hardware components (e.g., the processor 204 and/or any of its circuits 220, 221, 222, 223). The computer-executable instructions may be a part of various software programs and/or software modules.

The computer-executable code may include communication instructions 240, control instructions, assembly instructions, and/or other instructions 243. In some configurations, the instructions 240-243 individually or in some combination may be configured to establish a radio connection for the wireless communication, determine a configuration for whether to segment one or more packets for the wireless communication using the established radio connection, and/or communicate the one or more packets based on the determined configuration. In some configurations, the instructions may be configured to assemble a first frame comprising one or more packets, transmit the first frame, determine whether a portion of one or more packets was truncated during the assembling or transmitting of the first frame, and/or transmit a second frame comprising at least the truncated portion of the one or more packets of the first frame. In some configurations, the instructions may be configured to receive a first frame comprising one or more packets, determine that a portion of one or more packets is truncated, and/or determine whether to ignore as padding at least the truncated portion of the one or more packets of the first frame.

The foregoing description provides a non-limiting example of the computer-readable medium 206 of the scheduling entity 102. Although various computer-executable instructions 240, 241, 242 are described above, one of ordinary skill in the art will understand that the computer-readable medium 206 may also include various other computer-executable instructions 243 that are in addition and/or alternative(s) to the aforementioned computer-executable instructions 240, 241, 242. Such other computer-executable instructions 243 may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include configuration information 230. The configuration information 230 may include various types, quantities, configurations, arrangements, settings, parameters, and/or forms of information corresponding to a configuration for whether to segment one or more packets during assembly of a frame. The memory may also include criteria information 231. The criteria information 231 may include data and/or information associated with one or more criteria that may be utilized by an apparatus for determining whether to segment the one or more packets. Non-limiting examples of such criteria may include a transport block size threshold, a bandwidth waste percentile threshold, a data rate threshold, a packet size threshold, and/or a packet waste percentile threshold. Although various types of data of the memory 214 are described above, one of ordinary skill in the art will understand that the memory 214 may also include various other data that are in addition and/or alternative(s) to the aforementioned data 230, 231. Such other data may be associated with any one or more of the functions, methods, processes, features and/or aspects described herein.

One of ordinary skill in the art will also understand that the scheduling entity 102 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
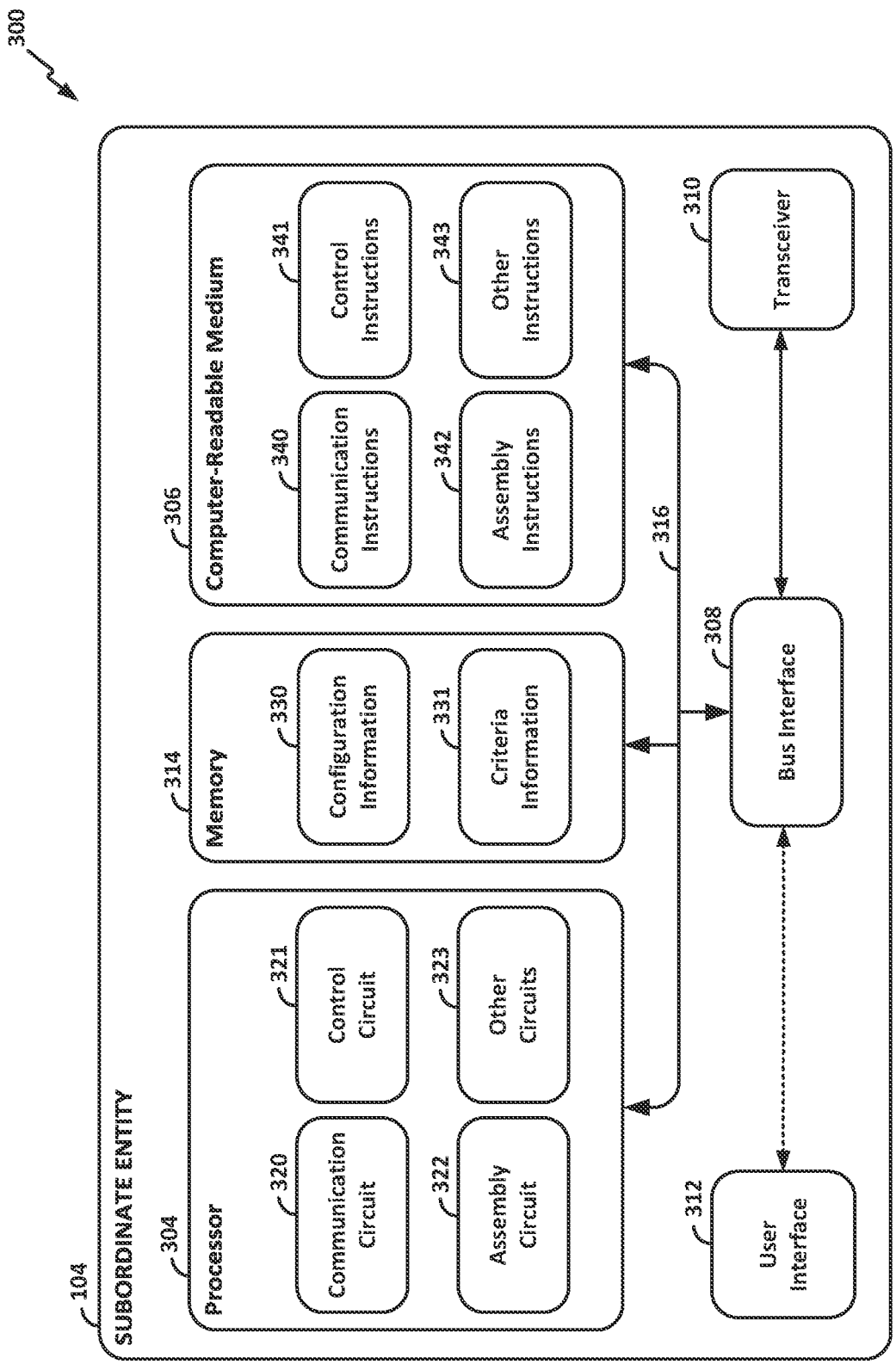
FIG. 3 is a diagram illustrating an example of a hardware implementation of the subordinate entity according to aspects of the present disclosure.

FIG. 3 is a diagram 300 illustrating an example of a hardware implementation of the subordinate entity 104 according to various aspects of the present disclosure. The subordinate entity 104 may include a user interface 312. The user interface 312 may be configured to receive one or more inputs from a user of the subordinate entity 104. In some configurations, the user interface 312 may be a keypad, a display, a speaker, a microphone, a joystick, and/or any other suitable component of the subordinate entity 104. The user interface 312 may exchange data via the bus interface 308. The subordinate entity 104 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a communication circuit 320, a control circuit 321, an assembly circuit 322, and/or other circuits 323. In some configurations, such circuits 320-323 may individually or in some combination include various hardware components and/or may perform various algorithms that provide the means for establishing a radio connection for the wireless communication, means for determining a configuration for whether to segment one or more packets for the wireless communication using the established radio connection, and/or means for communicating the one or more packets based on the determined configuration. In some configurations, such circuits 320-323 may individually or in some combination include various hardware components and/or may perform various algorithms that provide the means for assembling a first frame comprising one or more packets, means for transmitting the first frame, means for determining whether a portion of one or more packets was truncated during the assembling or transmitting of the first frame, and/or means for transmitting a second frame comprising at least the truncated portion of the one or more packets of the first frame. In some configurations, such circuits 320-323 may individually or in some combination include various hardware components and/or may perform various algorithms that provide the means for receiving a first frame comprising one or more packets, means for determining that a portion of one or more packets is truncated, means for determining whether to ignore as padding at least the truncated portion of the one or more packets of the first frame, and/or means for receiving a second frame comprising at least the truncated portion of the one or more packets of the first frame. In some configurations, such circuits 320-323 may individually or in some combination include various hardware components and/or may perform various algorithms that provide the means for determining whether to select between a segmentation-free operation and a segmentation-allowed operation and/or the means for communicating an indication to a peer entity, wherein the indication includes information associated with the determination.

The foregoing description provides a non-limiting example of the processor 304 of the scheduling entity 102. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may store computer-executable code, and the computer-executable code may include various instructions configured to perform various functions and/or enable various aspects described herein. The computer-executable code may be executed by various hardware components (e.g., the processor 304 and/or any of its circuits 320, 321, 322, 323). The computer-executable instructions may be a part of various software programs and/or software modules.

The computer-executable code may include communication instructions 340, control instructions, assembly instructions, and/or other instructions 343. In some configurations, the instructions 340-343 individually or in some combination may be configured to establish a radio connection for the wireless communication, determine a configuration for whether to segment one or more packets for the wireless communication using the established radio connection, and/or communicate the one or more packets based on the determined configuration. In some configurations, the instructions 340-343 may be configured to assemble a first frame comprising one or more packets, transmit the first frame, determine whether a portion of one or more packets was truncated during the assembling or transmitting of the first frame, and/or transmit a second frame comprising at least the truncated portion of the one or more packets of the first frame. In some configurations, the instructions 340-343 may be configured to receive a first frame comprising one or more packets, determine that a portion of one or more packets is truncated, and/or determine whether to ignore as padding at least the truncated portion of the one or more packets of the first frame. In some configurations, the instructions 340-343 may be configured to determine whether to select between a segmentation-free operation and a segmentation-allowed operation and/or communicate an indication to a peer entity, wherein the indication includes information associated with the determination.

The foregoing description provides a non-limiting example of the computer-readable medium 306 of the scheduling entity 102. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include configuration information 330. The configuration information 330 may include various types, quantities, configurations, arrangements, settings, parameters, and/or forms of information corresponding to a configuration for whether to segment one or more packets during assembly of a frame. The memory may also include criteria information 331. The criteria information 331 may include data and/or information associated with one or more criteria that may be utilized by an apparatus for determining whether to segment the one or more packets. Non-limiting examples of such criteria may include a transport block size threshold, a bandwidth waste percentile threshold, a data rate threshold, a packet size threshold, and/or a packet waste percentile threshold. Although various types of data of the memory 314 are described above, one of ordinary skill in the art will understand that the memory 314 may also include various other data that are in addition and/or alternative(s) to the aforementioned data 330, 331. Such other data may be associated with any one or more of the functions, methods, processes, features and/or aspects described herein.

One of ordinary skill in the art will also understand that the subordinate entity 104 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
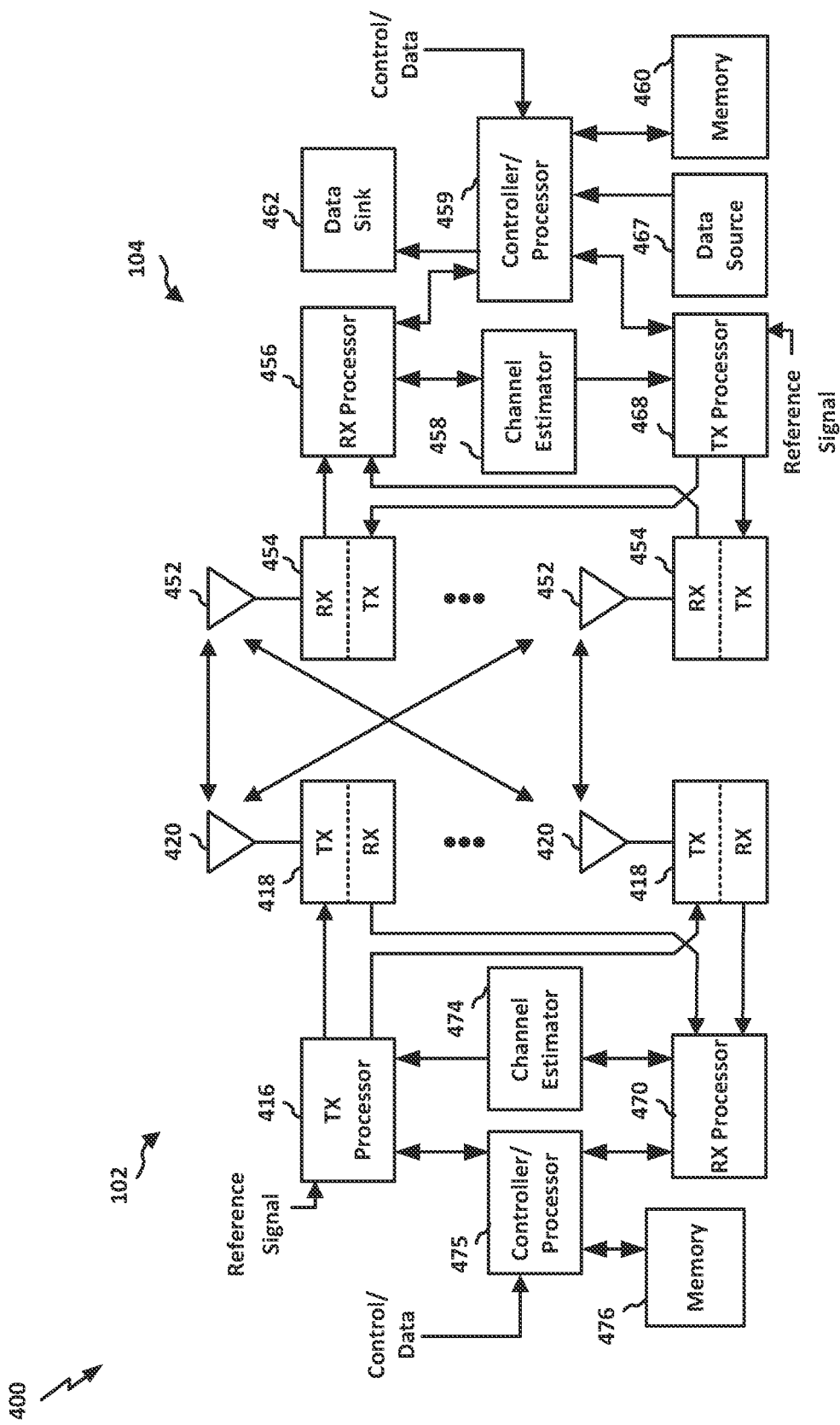
FIG. 4 is a diagram illustrating an example of the scheduling entity in communication with the subordinate entity in an access network according to aspects of the present disclosure.

FIG. 4 is a diagram 400 of the scheduling entity 102 in communication with the subordinate entity 104 in an access network according to aspects of the present disclosure. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 104 based on various priority metrics. The controller/processor 475 is also responsible for hybrid automatic repeat request (HARQ) operations, retransmission of lost packets, and signaling to the subordinate entity 104.

The transmit (TX) processor 416 implements various signal processing functions for the L1 layer (i.e., physical layer). The signal processing functions include coding and interleaving to facilitate forward error correction (FEC) at the subordinate entity 104 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 104. Each spatial stream may then be provided to a different antenna 420 via a separate transmitter 418TX. Each transmitter 418TX may modulate an RF carrier with a respective spatial stream for transmission.

Each receiver 418RX may be configured to receive wireless signals of various types, schemes, configurations, and/or modulations. The RX processor 470 may be configured to receive, decode, demodulate, and/or otherwise process any UL signal that is received by the receiver 418RX. In some examples, the UL signal is adapted for orthogonal frequency-division multiple access (OFDMA), which is a multi-user version of the modulation scheme referred to as orthogonal frequency-division multiplexing (OFDM). In some examples, the UL signal is adapted for single-carrier frequency-division multiple access (SC-FDMA). Such signals may even co-exist in some examples. In other words, the RX processor 470 and the receiver 418RX may perform UL communication using waveforms that may co-exist in OFDMA and SC-FDMA.

At the subordinate entity 104, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 104. If multiple spatial streams are destined for the subordinate entity 104, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 102. These soft decisions may be based on channel estimates computed by the channel estimator 458. The soft decisions are then decoded and deinterleaved to recover the data and control signals that were originally transmitted by the scheduling entity 102 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an ACK and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 102, the controller/processor 459 implements the L2 layer for the user plane and the control plane by providing header compression, ciphering, packet segmentation and reordering, and multiplexing between logical and transport channels based on radio resource allocations by the scheduling entity 102. The controller/processor 459 is also responsible for HARQ operations, retransmission of lost packets, and signaling to the scheduling entity 102.

Channel estimates derived by a channel estimator 458 from a reference signal or feedback transmitted by the scheduling entity 102 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

Each transmitter 454TX may be configured to transmit wireless signals of various types, schemes, configurations, and/or modulations. The TX processor 468 may be configured to generate, encode, modulate, and/or otherwise produce any UL signal that is transmitted by the transmitter 454TX. In some examples, the UL signal is adapted for OFDMA. In some examples, the UL signal is adapted for SC-FDMA. Such signals may even co-exist in some examples. In other words, the TX processor 468 and the transmitter 454TX may perform UL communication using waveforms that co-exist in OFDMA and SC-FDMA.

The UL transmission is processed at the scheduling entity 102 in a manner similar to that described in connection with the receiver function at the subordinate entity 104. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 104. Upper layer packets from the controller/processor 475 may be provided to the core network. The controller/processor 475 is also responsible for error detection using an ACK and/or NACK protocol to support HARQ operations.

A medium access control (MAC) protocol may perform various functions without deviating from the scope of the present disclosure. For example, such functions may include multiplexing MAC service data units (SDUs) from one or more different logical channels onto transport blocks to be delivered to the physical (PHY) layer on transport channels. As another example, such functions may include demultiplexing of MAC SDUs from one or more different logical channels from transport blocks delivered from the physical layer on transport channels. Such functions may also include priority handling between logical channels of a particular MAC entity and/or logical channel prioritization. An overview of some of these functions is provided below in Table 1.

TABLE 1

| MAC function | Subordinate Entity | Scheduling Entity | DL | UL |
| --- | --- | --- | --- | --- |
| Multiplexing | X | | | X |
| | | X | X | |
| Demultiplexing | X | | X | |
| | | X | | X |
| Priority handling between logical channels of one MAC entity | | X | X | X |
| Logical Channel prioritisation | X | | | X |

Figure 5:
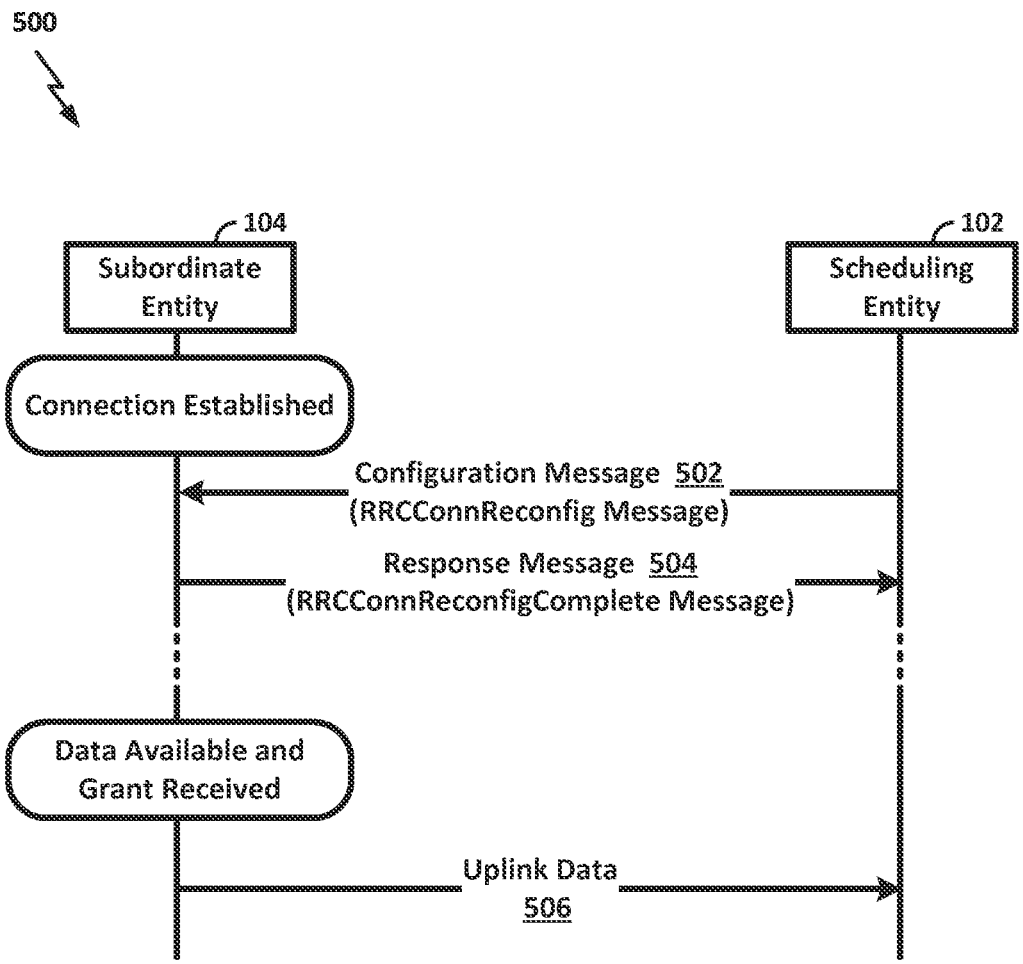
FIG. 5 is a diagram illustrating an example of establishing a configuration between the scheduling entity and the subordinate entity according to aspects of the present disclosure.

FIG. 5 is a diagram 500 illustrating an example of establishing a configuration between one apparatus (e.g., the scheduling entity 102) and another apparatus (e.g., the subordinate entity 104) according to aspects of the present disclosure. One apparatus (e.g., the scheduling entity 102) may transmit a configuration message 502 to another apparatus (e.g., the subordinate entity 104). In some configurations, the configuration message 502 may be a radio resource control (RRC) connection reconfiguration message, which may be transmitted upon or after establishing the connection. In some configurations, the configuration message 502 may be a MAC control element (CE), which may be transmitted any time that a connection is available. In some examples, the configuration message 502 may include information for configuring (or de-configuring, re-configuring, etc.) various parameters and/or settings (e.g., one or more criteria and/or thresholds). In some examples, the configuration message 502 may include information for activating (or deactivating) a segmentation-free (or segmentation-allowed) operation or mode. In some examples, the configuration message 502 may include information and/or commands configured to modify an RRC connection utilized by an apparatus (e.g., the subordinate entity 104). In some examples, the configuration message 502 may establish, modify, or release radio bearers. In some examples, the configuration message 502 may setup, modify, or release various measurements related to wireless communication. In some examples, the configuration message 502 may be configured various handover parameters, settings, and/or thresholds. After receiving the configuration message 502, one apparatus (e.g., the subordinate entity 104) transmits a response message 504 to another apparatus (e.g., the scheduling entity 102). In some configurations, the response message 504 may be a RRC connection reconfiguration complete message, which may be transmitted in response to the RRC connection reconfiguration message. In some configurations, the response message 504 may be a HARQ ACK, which may be transmitted in response to the MAC CE. Once data is available for transmission and a corresponding grant is received, one apparatus (e.g., the subordinate entity 104) transmits UL data 506 to another apparatus (e.g., the scheduling entity 102).

In certain circumstances, some data may need to be transmitted relatively quickly after receiving the grant. In other words, some circumstances may require data to be transmitted before there is enough time to perform some relatively complex, time-consuming, and/or processing-intensive operations at one or more intermediate layers. Put another way, some circumstances may impose throughput requirements that outweigh some processing considerations at certain intermediate layers. For instance, some data may need to be transmitted before some multi-layer processing is complete. Some non-limiting examples of multi-layer processing include radio link control (RLC) segmentation, RLC aggregation, MAC segmentation, MAC aggregation, and/or various other related processes. For example, the amount of time necessary to perform RLC segmentation may exceed the amount of time allowed for transmission of some data for which the grant has been received. Put another way, some data may need to be transmitted within a particular period of time after receiving the grant, and that particular period of time is less than the amount of time necessary to perform some multi-layer processing (e.g., RLC or MAC segmentation). Accordingly, there may exist circumstances in which data may need to be transmitted without performing (e.g., bypassing) at least one multi-layer processing operation (e.g., RLC or MAC segmentation). Although various examples described in the present disclosure may refer to segmentation at the RLC and MAC layers, one of ordinary skill in the art will understand that aspects of the present disclosure may be applied to various additional or alternative processes performed at additional or alternative layers without deviating from the present disclosure. However, some existing systems may not have configurations for determining whether to segment one or more packets (e.g., at the RLC/MAC layer). In other words, some existing systems may either always perform segmentation (e.g., at the RLC/MAC layer) or always do not perform segmentation (e.g., at the RLC/MAC layer); however, such existing systems may not provide criteria for an apparatus to determine whether to segment one or more packets (e.g., at the RLC/MAC layer). Put another way, some existing systems may not enable a switching between a segmentation-allowed operation and a segmentation-free operation. As such, some existing systems may benefit from features that enable certain high throughput, low latency, and/or mission critical communications.

In comparison to some existing systems, aspects of the present disclosure provide for determining a configuration for whether to segment one or more packets (e.g., at the RLC/MAC layer) and communicating the one or more packets based on that determined configuration. Put another way, aspects of the present disclosure provide for a switching between a segmentation-allowed operation and a segmentation-free operation based on certain criteria. One of ordinary skill in the art will understand that the aforementioned 'determining' of the configuration of whether to segment one or more packets (e.g., at the RLC/MAC layer) may be performed by the subordinate entity 104 and/or the scheduling entity 102 without deviating from the scope of the present disclosure. With respect to the scheduling entity 102, the 'determining' of the configuration of whether to segment one or more packets (e.g., at the RLC layer) may include transmitting the configuration of whether to segment one or more packets (e.g., at the RLC/MAC layer) to the subordinate entity 104 (e.g., in the configuration message 502). With respect to the subordinate entity 104, the 'determining' of the configuration of whether to segment one or more packets (e.g., at the RLC/MAC layer) may include receiving an indication of whether to segment one or more packets (e.g., at the RLC/MAC layer) from the scheduling entity 102 (e.g., in the configuration message 502). In some configurations, such an indication may be a control signal, an in-band signal, and/or any other suitable communication.

In some examples, the configuration may include one or more criteria. When the one or more criteria are satisfied, segmentation (e.g., at the RLC/MAC layer) may be disallowed. When the one or more criteria are unsatisfied, segmentation (e.g., at the RLC/MAC layer) may be allowed. The criteria may correspond to various settings, configurations, or parameters associated with the wireless communication of those one or more packets without deviating from the scope of the present disclosure. Although some non-limiting examples of such criteria may be described herein, one of ordinary skill in the art will understand that additional and alternative criteria exist within the scope of the present disclosure.

Some non-limiting examples of such criteria correspond to various thresholds. An example of such a threshold is a transport block size threshold. When the estimated transport block size is greater than the transport block size threshold, then segmentation (e.g., at the RLC/MAC layer) may be disallowed. Conversely, when the estimated transport block size is less than the transport block size threshold, then segmentation (e.g., at the RLC/MAC layer) may be allowed. Another example of such a threshold is a bandwidth waste percentile threshold. If an estimated bandwidth waste is less than the bandwidth waste percentile threshold, then segmentation (e.g., at the RLC/MAC layer) may be disallowed. Conversely, if an estimated bandwidth waste is greater than the bandwidth waste percentile threshold, then segmentation (e.g., at the RLC/MAC layer) may be allowed. Yet another example of such a threshold is a data rate threshold. If an estimated data rate is greater than the data rate threshold, then segmentation (e.g., at the RLC layer) may be disallowed. Conversely, if an estimated data rate is greater than the data rate threshold, then segmentation (e.g., at the RLC/MAC layer) may be allowed. An additional example of such a threshold is a packet size threshold. If an estimated packet size is greater than the packet size threshold, then segmentation (e.g., at the RLC/MAC layer) may be disallowed. Conversely, if an estimated packet size is smaller than the packet size threshold, then segmentation (e.g., at the RLC/MAC layer) may be allowed. A further example of such a threshold is a packet waste percentile threshold. If an estimated packet waste is less than the packet waste percentile threshold, then segmentation (e.g., at the RLC/MAC layer) may be disallowed. Conversely, if an estimated packet waste is greater than the packet waste percentile threshold, then segmentation (e.g., at the RLC/MAC layer) may be allowed. An additional example of such a threshold is a processing load threshold. For example, a computer, processor, circuit, central processing unit (CPU), or other similar component of an apparatus (e.g., scheduling entity 102 and/or subordinate entity 104) may have a certain load (e.g., a certain amount of processes) that it can handle (e.g., process) at a particular period of time. The processing load threshold may be equal to that load or any lesser amount (e.g., a percentage of) that load without deviating from the scope of the present disclosure.

In some examples, the configuration may be associated with a particular data flow. A particular data flow may include one or more bearers (e.g., radio bearers). Also, a particular bearer may be associated with one or more data flows. Two bearers may have different thresholds for determining whether to perform segmentation. For example, one bearer may have a particular threshold value (e.g., x) while another bearer may have a different threshold value (e.g., y, wherein x≠y). As such, it may be possible that one bearer sometimes performs segmentation while another bearer does not perform segmentation.

The aforementioned configurations may be implemented in various manners without necessarily deviating from the scope of the present disclosure. Although some options of such configurations are provided herein, one of ordinary skill in the art will understand that other options may exist within the scope of the present disclosure. One option ("Option 1") may involve each bearer (e.g., radio bearer) or logical channel configured to allow or disallow (e.g., prohibit) segmentation. For example, each bearer may have a value of 'true' (indicating that traffic for that bearer may be segmented; i.e., segmentation-allowed) or 'false' (indicating that that traffic for that bearer may not be segmented; i.e., segmentation-free). In such circumstances, the bearer may be associated with the PHY channels.

In such circumstances, the apparatus may implement or utilize at least some of the configurations shown under "Option 1" provided below. Such configurations may correspond to the Drb-ToAddModList of the RadioResourceConfigDedicated information element defined in TS 36.331.

| Option 1 |
|---|
| Drb-ToAddModList Information Element |

```
-- ASN1START
DRB-ToAddModList ::=    SEQUENCE (SIZE (1..maxDRB)) OF DRB-ToAddMod
DRB-ToAddMod ::= SEQUENCE {
    eps-BearerIdentity       INTEGER (0..15)        OPTIONAL,
        -- Cond DRB-Setup
    drb-Identity             DRB-Identity,
    pdcp-Config              PDCP-Config            OPTIONAL,
        -- Cond PDCP
    rlc-Config               RLC-Config             OPTIONAL,
        -- Cond Setup
    logicalChannelIdentity   INTEGER (3..10)        OPTIONAL,
        -- Cond DRB-Setup
    logicalChannelConfig     LogicalChannelConfig   OPTIONAL,
        -- Cond Setup
    segmentationAllowed      BOOLEAN
    ...,
}
-- ASN1STOP
```

| Drb-ToAddModList field descriptions |
|---|
| Segmentation-allowed |
| For DRBs the segmentation-allowed is used to indicate whether data for the corresponding DRB is allowed to be segmented |

Another option ("Option 2") may involve each apparatus (e.g., subordinate entity 104 and/or scheduling entity 102) being configured to allow or disallow (e.g., prohibit) segmentation. In such an option, all bearers associated with that apparatus may follow the same configuration. When segmentation is allowed (e.g., during a segmentation-allowed operation), one or more thresholds may be configured, and the apparatus may uses the one or more thresholds to determine whether segmentation should be performed for a given MAC protocol data unit (PDU). In such circumstances, the RadioResourceConfigDedicated information element defined in TS 36.331 may include at least some of the configurations shown under "Option 2" provided below.

| Option 2 |
|---|
| RadioResourceConfigDedicated Information Element |

```
RadioResourceConfigDedicated ::=        SEQUENCE {
    srb-ToAddModList                    SRB-ToAddModList       OPTIONAL,
        -- Cond HO-Conn
    drb-ToAddModList                    DRB-ToAddModList       OPTIONAL,
        -- Cond HO-toEUTRA
    drb-ToReleaseList                   DRB-ToReleaseList      OPTIONAL,
        -- Need ON
    mac-MainConfig                      CHOICE {
                    explicitValue           MAC-MainConfig,
                    defaultValue            NULL                 --
    }                                   OPTIONAL,
    Cond HO-toEUTRA2
```

| Option 2 |
| --- |
| MACSegmentationCOnfig ::= CHOICE {<br>   segmentation-free,<br>segmentation-allowed                      SegmentationAllowed-Config<br>}<br>sps-Config                                 SPS-Config            OPTIONAL,<br>-- Need ON<br>physicalConfigDedicated               PhysicalConfigDedicated<br>OPTIONAL,       -- Need ON<br>...,<br>[[ rlf-TimersAndConstants-r9        RLF-TimersAndConstants-r9<br>OPTIONAL        -- Need ON<br>]],<br>[[ measSubframePatternPCell-r10     MeasSubframePatternPCell-r10<br>OPTIONAL        -- Need ON<br>]],<br>[[ neighCellsCRS-Info-r11          NeighCellsCRS-Info-r11<br>OPTIONAL        -- Need ON<br>]] ,<br>[[ naics-Info-r12                     NAICS-AssistanceInfo-r12<br>OPTIONAL        -- Need ON<br>]]} |
| SegmentationAllowed-Config Information Element |
| SegmentationAllowed-Config ::=        SEQUENCE{<br>Tx-Segmentation-Threshold::= CHOICE{<br>    percentile INTEGER(1..100),<br>    tbSize  ENUMERATED {tbSize1, tbSize2, tbSize3, etc.}<br>},<br>autonomous-truncation-handling :: = CHOICE{<br>    resegmentation-free-handling,<br>    resegmentation-allowed-handling<br>}<br>} |

| RadioResourceConfigDedicated Field Descriptions |
| --- |
| MACSegmentationCOnfig<br>For the UE MACSegmentationConfig is used to indicate whether data for the UE is allowed to be segmented |

| SegmentationAllowed-Config Field Descriptions |
| --- |
| Tx-Segmentation-Threshold<br>The threshold is used to determine at transmitting a MAC PDU if segmentation should be performed within a given MAC PDU<br>autonomous-truncation-handling<br>This is used to determine if the received truncated MAC SDU should be identified as padding or segment<br>Percentile<br>The bandwidth waste threshold represented as a percentile. Value means the percentile of the wasted space. When the bandwidth waste without segments is larger than this value segmentation should be performed<br>tbSize<br>The size of transport block threshold. Value is in bytes, means the transport block size. When the transport block size is larger than this value segmentation should be performed, i.e. Tx multiplexes segment if the estimated TB size is smaller than tbSize. |

Figure 6:
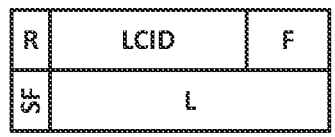
FIG. 6 is a diagram illustrating an example of various medium access control (MAC) subheader configurations according to aspects of the present disclosure.
Figure 6:
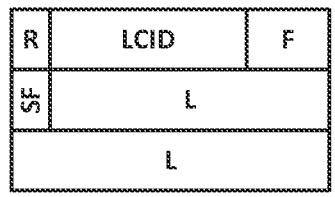
Figure 6:
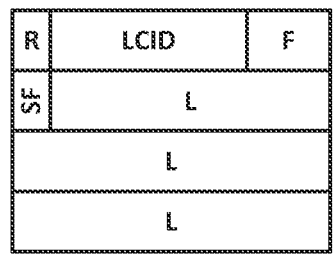
Figure 6:
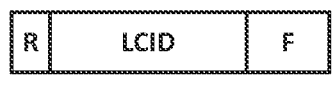
Figure 7:
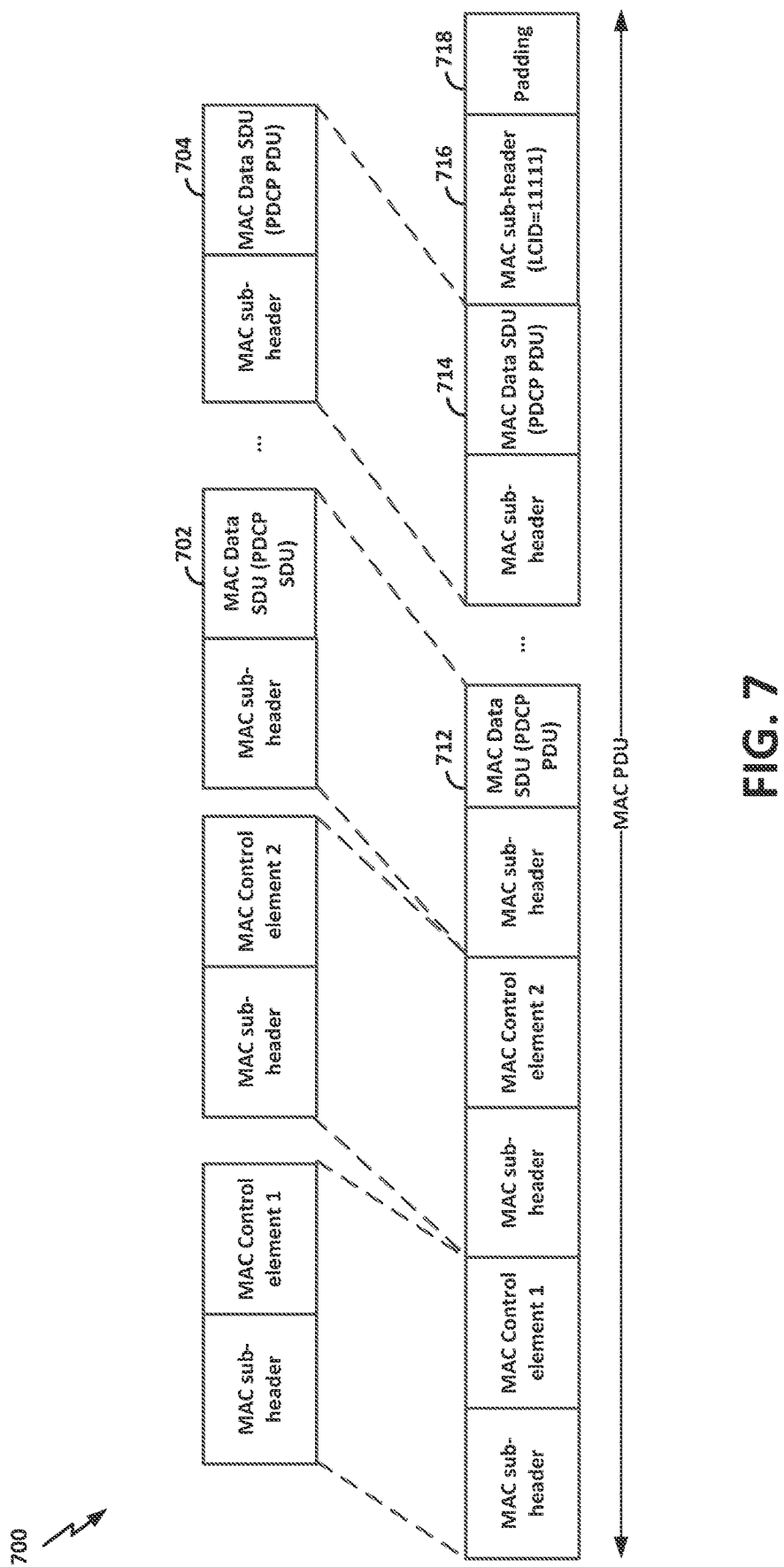
FIG. 7 is a diagram illustrating an example of a MAC protocol data unit (PDU) assembled without segmentation according to aspects of the present disclosure.
Figure 8:
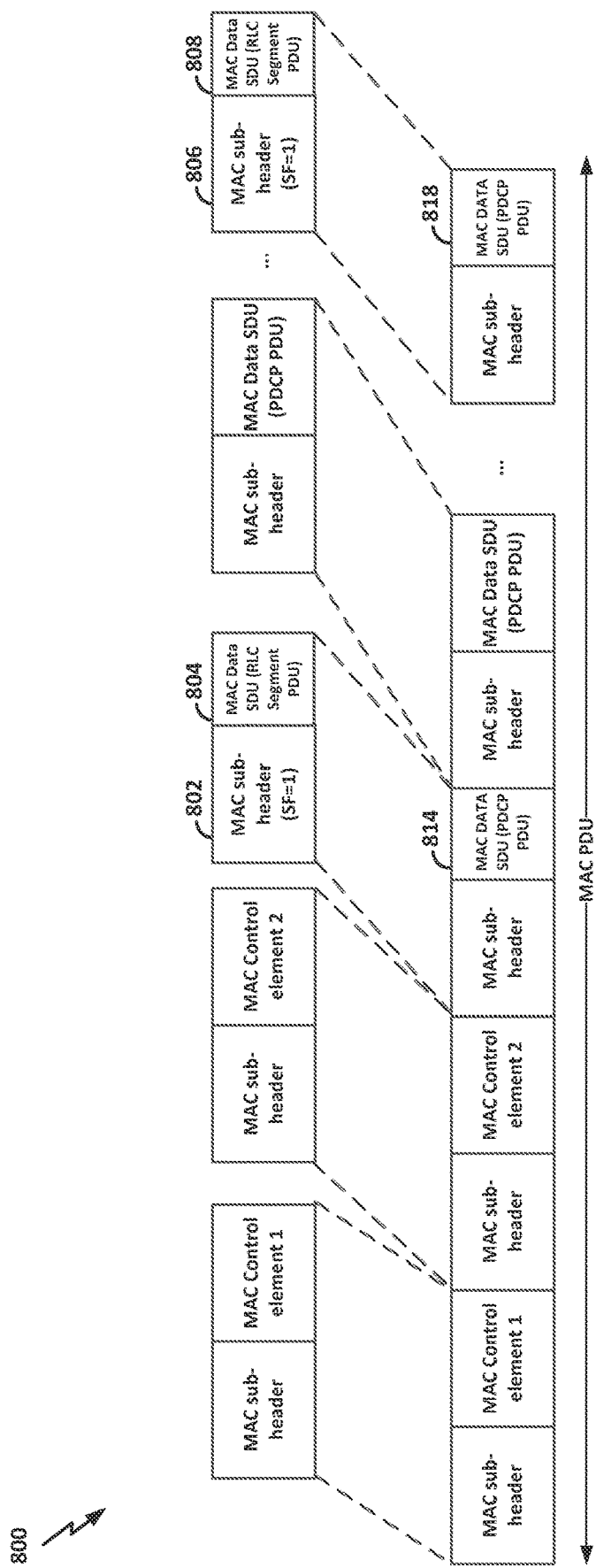
FIG. 8 is a diagram illustrating an example of a MAC PDU assembled with segmentation according to aspects of the present disclosure.

FIG. 6 is a diagram 600 illustrating an example of various MAC subheader configurations according to aspects of the present disclosure. A MAC subheader may be included in a MAC PDU. (The description provided here with reference to FIG. 6 emphasizes various aspects related to the MAC subheaders. Various examples of the MAC PDUs that possibly contain such MAC subheaders are illustrated in FIGS. 7-8 and described further below.)

Generally, MAC subheaders are generally octet-aligned. The MAC subheaders and the MAC SDUs may have variable sizes. Each MAC subheader may correspond to a MAC SDU, a MAC control element, or padding. MAC control elements may be placed before any MAC data SDU. Although various non-limiting examples of MAC subheaders are illustrated in FIG. 6, one of ordinary skill in the art will understand that the MAC subheaders may be provided in various configurations without deviating from the scope of the present disclosure.

In some configurations, the MAC subheader may include one or more of the subfields shown in Table 2 (below).

TABLE 2

| Field | Meaning | Length |
| --- | --- | --- |
| R | Reserved | 1 |
| LCID | Logical Channel ID | 5 |
| F | Format field<br>(00: 7 bits L, 01: 15 bits L, 10: 23 bits L,<br>11: No L, i.e. 1 byte sub-header) | 2 |
| SF | Segmentation Flag<br>(SF = 1 indicates segmented data) | 1 |
| L | Length of data in octets | 7, 15, 23 |

The reserved (R) field may have a length or size of one (1) bit. The Logical Channel ID (LCID) field may have a length or size of five (5) bits. The LCID field may identify the logical channel instance of the corresponding MAC SDU or the type of the corresponding MAC control element or padding. There may be one LCID field for each MAC SDU, MAC control element, or padding included in the MAC PDU. In some examples, LCID=11111 indicates padding longer than single-byte at the end of the MAC PDU.

A non-limiting example of various LCID values for a DL shared channel (SCH) is provided below in Table 3.

TABLE 3

| Index | LCID Value |
| --- | --- |
| 00000 | Common Control Channel (CCCH) |
| 00001-01010 | Identity of the Logical Channel |
| 01011-11101 | Reserved |
| 11110 | Segmentation Allowed |
| 11111 | Padding |

A non-limiting example of various LCID values for an UL SCH is provided below in Table 4.

TABLE 4

| Index | LCID Value |
| --- | --- |
| 00000 | CCCH |
| 00001-01010 | Identity of the Logical Channel |
| 01011-11101 | Reserved |
| 11110 | Segmentation Allowed |
| 11111 | Padding |

The Format (F) field may have a length or size of two (2) bits. The F field may indicate the length or size of the Length (L) field. There may exist one F field per MAC SDU subheader. If the maximum length or size of the MAC SDU or variable-sized MAC control element is less than 128 bytes, then the value of the F field may be set to a value of 00. If the maximum length or size of the MAC SDU or variable-sized MAC control element is more than 128 bytes and less than 32768 bytes, then the value of the F field may be set to a value of 01. Otherwise, the value of the F field may be set to a value of 10. F=11 indicates that no L field follows the F field.

A non-limiting example of various F field values is provided below in Table 4.

TABLE 5

| Index | Size of Length Field (in bits) |
| --- | --- |
| 00 | 7 |
| 01 | 15 |
| 10 | 23 |
| 11 | No Length Field |

The L field may have various sizes or lengths, such as 7, 15, or 23 bits. The size of the L field may be indicated by the F field (described above). The L field may indicate the length or size of the corresponding MAC SDU or variable-sized MAC control element in bytes. There may exist one L field per MAC PDU subheader except for the padding subheader, and subheaders corresponding to fixed-sized MAC control elements.

FIG. 7 is a diagram 700 illustrating an example of a MAC PDU assembled without segmentation according to aspects of the present disclosure. In other words, FIG. 7 illustrates an example of a MAC PDU assembled during a segmentation-free operation. Put in another way, the MAC PDU illustrated in FIG. 7 is assembled when the apparatus (e.g., scheduling entity 102 and/or subordinate entity 104) determines to disallow segmentation (e.g., at the RLC/MAC layer). Various aspects pertaining to the MAC control element and MAC subheader are described above with reference to FIG. 6 and therefore will not be repeated. Generally, a MAC PDU includes zero or more MAC subheader and control element pairs followed by one or more MAC subheader and MAC data service data unit (SDU) pairs, and possibly padding (e.g., single-byte padding, two-byte padding, etc.). In FIG. 7, the MAC data SDUs (e.g., packet data convergence protocol (PDCP) SDUs) 702, 704 are assembled as MAC data SDUs (e.g., PDCP PDUs) 712, 714 without segmentation. The MAC PDU may sometimes include padding 718. If the MAC PDU includes padding 718, a preceding MAC subheader 716 may be included, and the LCID field in that preceding MAC subheader 716 may have a value of 11111. As described in greater detail above with reference to FIG. 6 and Table 3, LCID=11111 indicates padding at the end of the MAC PDU.

In comparison to FIG. 7, FIG. 8 is a diagram 800 illustrating an example of a MAC PDU assembled with segmentation according to aspects of the present disclosure. In other words, FIG. 8 illustrates an example of a MAC PDU assembled during a segmentation-allowed operation. Put in another way, the MAC PDU illustrated in FIG. 8 is assembled when the apparatus (e.g., scheduling entity 102 and/or subordinate entity 104) determines to allow segmentation (e.g., at the RLC/MAC layer). Various aspects pertaining to the MAC control element and MAC subheader are described above with reference to FIG. 6 and therefore will not be repeated. In FIG. 8, the MAC data SDUs 804, 808 (e.g., RLC segment PDUs) are assembled as segments of MAC data SDUs (e.g., PDCP PDUs) 814, 818 in the MAC PDU. The MAC subheaders 802, 806 corresponding to the MAC data SDUs (e.g., RLC segment PDUs) 804, 808 may each have an SF field having a value of 1. As described in greater detail above with reference to FIG. 6 and Table 2, SF=1 indicates segmented data.

Figure 9:
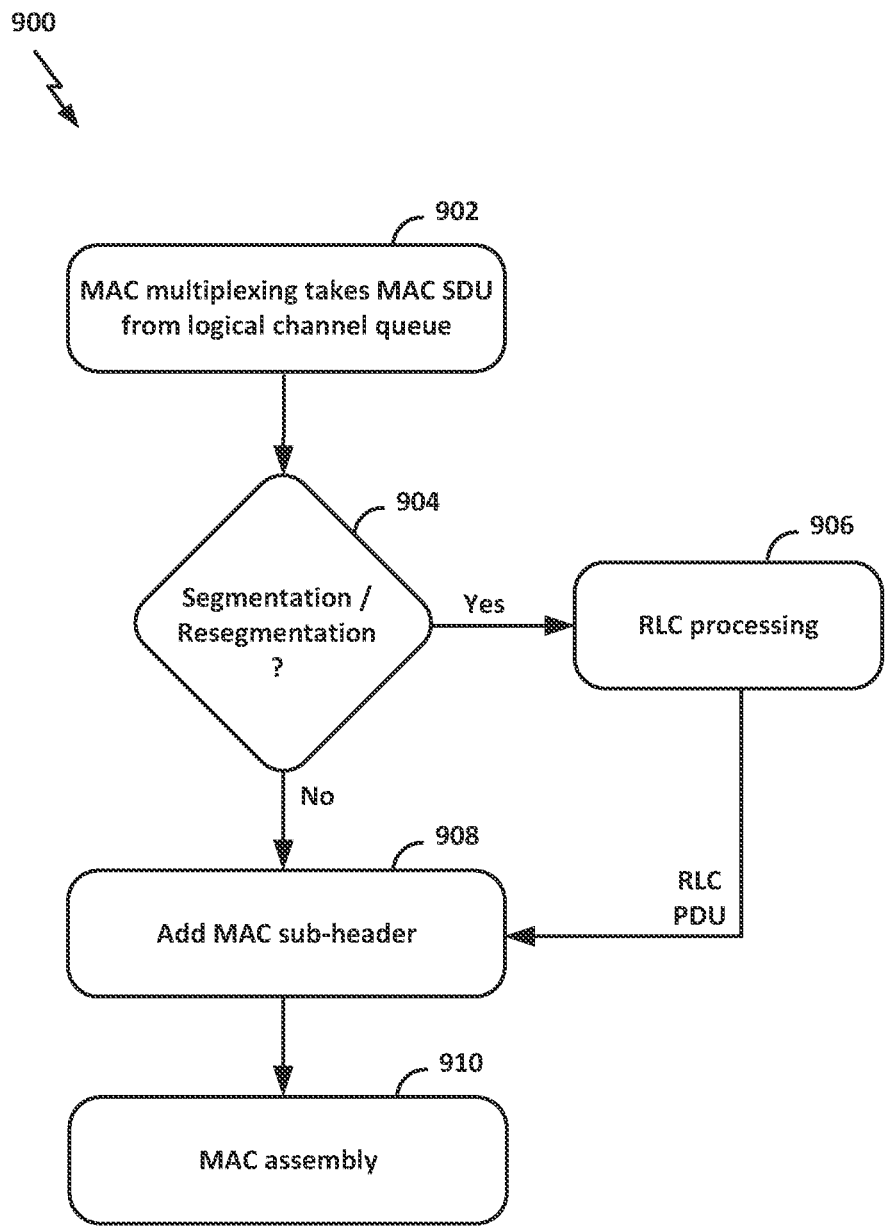
FIG. 9 is a diagram illustrating an example of processes associated with assembly of a MAC PDU with segmentation according to aspects of the present disclosure.

FIG. 9 is a diagram 900 illustrating an example of processes associated with assembly of the MAC PDU with segmentation (e.g., as described above with reference to FIG. 8) according to aspects of the present disclosure. Such processes may be performed by any apparatus configured for wireless communication, such as the scheduling entity 102 and/or the subordinate entity 104. At block 902, the apparatus may perform MAC multiplexing of MAC SDUs from logical channel queues. At block 904, the apparatus may determine whether to perform segmentation (or re-segmentation). Even when segmentation is allowed, the apparatus may take steps to minimize segmentation of PDCP PDUs as much as possible. On the one hand, if the apparatus determines that segmentation is appropriate at block 904, then the apparatus may perform RLC processing at block 906. After performing RLC processing at block 906, the apparatus may generate an RLC PDU to which a MAC subheader is added at block 908. On the other hand, if the apparatus determines that segmentation is not appropriate (e.g., not necessary) at block 904, then the apparatus may refrain from performing one or more processes at the RLC layer and add a MAC subheader at block 908. After adding the MAC subheader at block 908, the apparatus may perform MAC assembly at block 910. MAC assembly may result in the generation of the MAC PDU, such as the MAC PDU illustrated in FIG. 8 and described further above. While this process 900 illustrates one example where segmentation operations are captured at the RLC layer, it is to be understood that this is merely one example. One of ordinary skill in the art will recognize that simple modifications to this process 900, e.g., in an example where segmentation operations are captured at the MAC layer, fall within the scope of the present disclosure.

Figure 10:
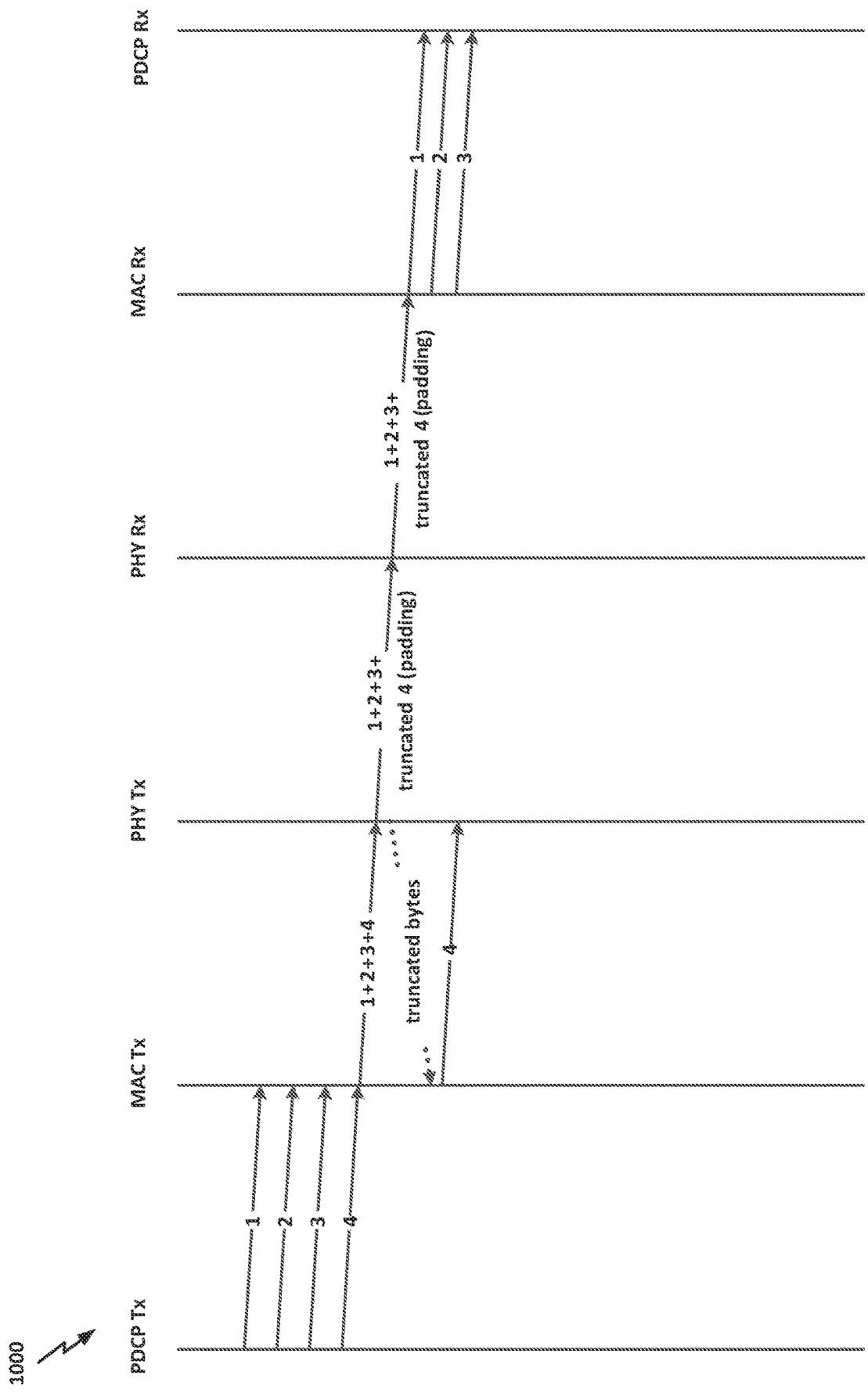
FIGS. 10-14 are diagrams illustrating various examples of truncation of a MAC PDU at a physical (PHY) layer according to aspects of the present disclosure.

FIG. 10 is a diagram 1000 illustrating an example of truncation of a MAC PDU at the PHY layer (e.g., during assembly of the PDU or during transmission of the PDU) according to aspects of the present disclosure. In the example illustrated in FIG. 10, a number of packets (e.g., packets 1, 2, 3, 4) are provided from the PDCP layer of a transmitting apparatus to the MAC layer of the transmitting apparatus. However, in some circumstances, not all of those packets (e.g., packets 1, 2, 3, 4) may fit into a single transmission at the PHY layer of the transmitting apparatus. In such circumstances, the PHY layer of the transmitting apparatus may perform autonomous truncation of at least a portion of one or more of the packet. For example, the PHY layer of the transmitting apparatus may truncate a portion of packet 4, as illustrated in FIG. 10. Subsequently, the PHY layer of the transmitting apparatus may transmit the one or more packets and any truncated portions thereof. As illustrated in FIG. 10, the PHY layer of the receiving apparatus may receive (untruncated) packets 1, 2, 3 and truncated packet 4.

In some examples, truncation may be performed during a segmentation-free operation, which is described in greater detail above. During a segmentation-free operation, the truncated packet(s) may be recognized as padding, as indicated in FIG. 10. For example, the PHY layer of the receiving apparatus may recognize that packet 4 is truncated and, therefore, should be ignored as padding. Accordingly, the MAC layer of the receiving device ignores the truncated packet(s) (e.g., packet 4) as padding and passes the untruncated packets (e.g., packets 1, 2, 3) to the PDCP layer of the receiving apparatus for further processing. If the PHY layer of the transmitting apparatus truncates at least a portion of one or more portions of the packets, the PHY layer of the transmitting layer may communicate information pertaining to the truncation to the MAC layer of the transmitting apparatus. For example, as illustrated in FIG. 10, the PHY layer of the transmitting apparatus may communicate information indicating the truncated bytes to the MAC layer of the transmitting apparatus. This information may be utilized by the MAC layer of the transmitting apparatus to reschedule retransmission of the entirety of the truncated packet (e.g., packet 4). Accordingly, as illustrated in FIG. 10, the formerly-truncated packet 4 is subsequently provided (in its entirety) from the MAC layer of the transmitting apparatus to the PHY layer of transmitting apparatus. In some circumstances, the subsequently-transmitted packet (e.g., packet 4) may have a relatively high priority in its transmission opportunity. In other words, the subsequently-transmitted packet (e.g., packet 4) may have a priority that is relatively higher than a priority of one or more other packets (not shown) that may be concurrently ready for transmission.

In some other examples, truncation may be performed during a segmentation-allowed operation, which is described in greater detail above. During a segmentation-allowed operation, the truncated packet(s) (e.g., packet 4) may be (i) recognized as padding and/or (ii) recognized as a segment by the receiving apparatus. On the one hand, if the truncated packet(s) (e.g., packet 4) is recognized as padding by the receiving apparatus, the truncated packet(s) (e.g., packet 4) may be discarded and/or ignored by the receiving apparatus, as similarly described above with reference to FIG. 10. Such an operation may sometimes be characterized as a resegmentation-free operation. Non-limiting examples of resegmentation-free operations are described in greater detail below in relation to FIG. 11. On the other hand, if the truncated packet(s) (e.g., packet 4) is recognized as a segment by the receiving apparatus, such an operation may sometimes be characterized as a resegmentation-allowed operation. Non-limiting examples of resegmentation-allowed operations are described in greater detail below with reference to FIGS. 12-14.

Figure 11:
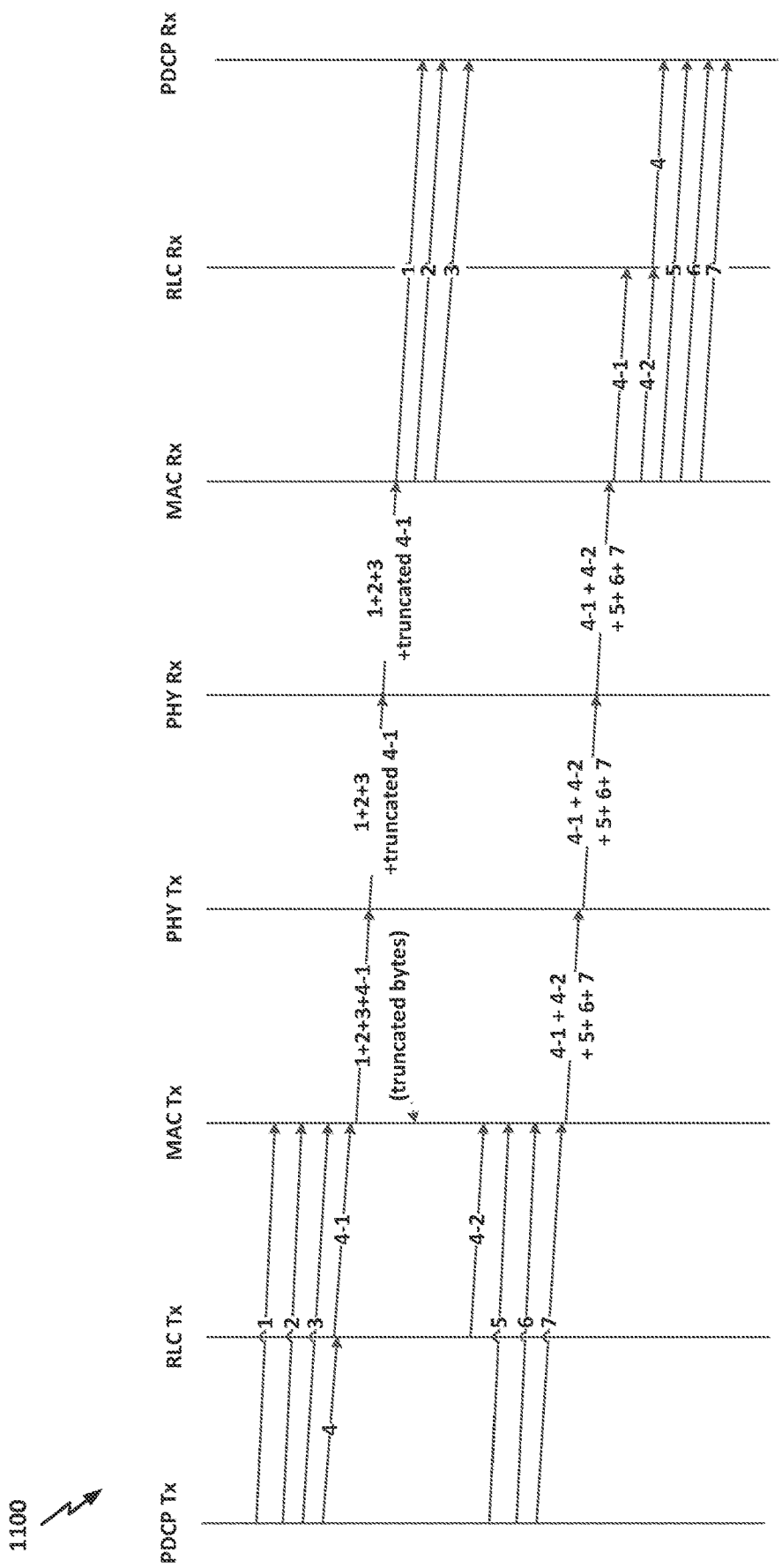

FIG. 11 is a diagram 1100 illustrating another example of truncation of a MAC PDU at the PHY layer according to aspects of the present disclosure. In part, the example illustrated in FIG. 11 shows an operation that may sometimes be referred to as a resegmentation-free operation. Generally, in a resegmentation-free operation, one or more truncated packet(s) are recognized as padding by the receiving apparatus and thus are discarded and/or ignored by the receiving apparatus, as similarly described above with reference to FIG. 10. However, in comparison to the example illustrated in FIG. 10, the example illustrated in FIG. 11 depicts that at least one of the packets is segmented at an intermediate layer of the transmitting apparatus. For instance, packet 4 is segmented into packet segment 4-1 and packet segment 4-2 at the RLC layer of the transmitting apparatus.

The first packet segment (e.g., packet segment 4-1) is provided to the MAC layer of the transmitting apparatus. In some circumstances, not all of those components (e.g., packets 1, 2, 3 and packet segment 4-1) may fit into a single transmission at the PHY layer of the transmitting apparatus. In such circumstances, the PHY layer of the transmitting apparatus may perform autonomous truncation of at least a portion of one or more of those components. For example, the PHY layer of the transmitting apparatus may truncate a portion of packet 4-1, as indicated in FIG. 11. Subsequently, the PHY layer of the transmitting apparatus may transmit the one or more packets and any truncated segments thereof. As illustrated in FIG. 11, the PHY layer of the receiving apparatus may receive (untruncated) packets 1, 2, 3 and truncated packet segment 4-1. The receiving apparatus may recognize the truncated packet segment(s) (e.g., packet segment 4-1) as padding. Accordingly, the receiving apparatus may ignore and/or discard such truncated segment(s) (e.g., packet segment 4-1). Subsequently, the receiving apparatus may pass the other portions of the transmission (e.g., packets 1, 2, 3) to upper layers (e.g., the RLC layer, PDCP layer, etc.) for further processing.

If the PHY layer of the transmitting apparatus truncates at least a portion of a packet segment, the PHY layer of the transmitting layer may communicate information pertaining to the truncation to the MAC layer of the transmitting apparatus. For example, as illustrated in FIG. 11, the PHY layer of the transmitting apparatus may communicate information indicating the truncated bytes to the MAC layer of the transmitting apparatus. This information may be utilized by the MAC layer of the transmitting apparatus to reschedule retransmission of the entirety of the truncated packet segment (e.g., packet segment 4-1). Accordingly, as illustrated in FIG. 11, the formerly-truncated packet segment 4-1 is subsequently provided (in its entirety) from the MAC layer of the transmitting apparatus to the PHY layer of transmitting apparatus. That packet segment (e.g., packet segment 4-1) may also be combined with another packet segment (e.g., packet segment 4-2, which was previously segmented at the RLC layer) and/or one or more other packets (e.g., packets 5, 6, 7). Such a combination (e.g., including packet segments 4-1, 4-2 and packets 5, 6, 7) may be transmitted from the PHY layer of the transmitting apparatus and received at the PHY layer of the receiving apparatus. At an intermediary layer (e.g., the RLC layer) of the receiving apparatus, the packet segments (e.g., packet segments 4-1, 4-2) may be assembled together to generate an unsegmented packet (e.g., packet 4), as illustrated in FIG. 11.

Figure 12:
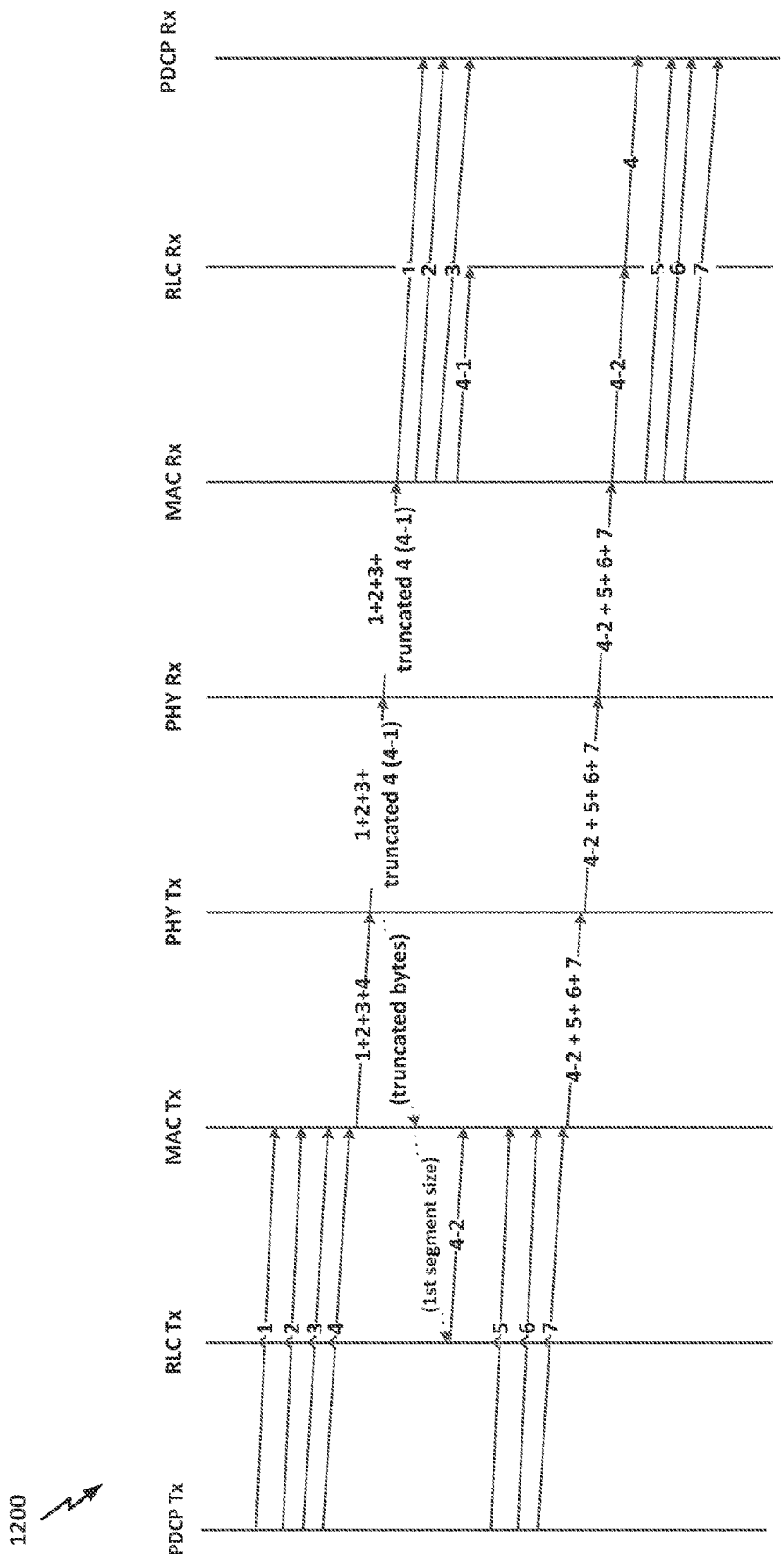

FIG. 12 is a diagram 1200 illustrating yet another example of truncation of a MAC PDU at the PHY layer according to aspects of the present disclosure. In part, the example illustrated in FIG. 12 shows an operation that may sometimes be referred to as a resegmentation-allowed operation. Generally, in a resegmentation-allowed operation, one or more truncated packet(s) are recognized as a segment of a packet and thus are not automatically discarded and/or ignored by the receiving apparatus. In comparison to the example illustrated in FIG. 11, the example illustrated in FIG. 12 depicts that at least one of the packets (e.g., packet 4) is not segmented at an intermediate layer (e.g., RLC/MAC layer) of the transmitting apparatus. For example, packet 4 is not segmented into packet segment 4-1 and packet segment 4-2 at the RLC layer of the transmitting apparatus; instead, packet 4 is communicated in its entirety to the MAC layer of the transmitting apparatus, as illustrated in FIG. 12.

However, in some circumstances, not all of those packets (e.g., packets 1, 2, 3, 4) may fit into a single transmission at the PHY layer of the transmitting apparatus. In such circumstances, the PHY layer of the transmitting apparatus may perform autonomous truncation of at least a portion of one or more of the packets. For example, the PHY layer of the transmitting apparatus may truncate a portion of packet 4, as illustrated in FIG. 12. Subsequently, the PHY layer of the transmitting apparatus may transmit the one or more packets and any truncated segments thereof. As illustrated in FIG. 12, the PHY layer of the receiving apparatus may receive (untruncated) packets 1, 2, 3 and truncated packet segment 4-1. The receiving apparatus may recognize the truncated packet segment(s) (e.g., packet segment 4-1) as a segment of a packet (e.g., not padding) and thus may not automatically discard and/or ignore it.

In circumstances where the PHY layer of the transmitting apparatus truncates at least a portion of a packet segment, the PHY layer of the transmitting layer may communicate information pertaining to the truncation to the MAC layer of the transmitting apparatus. For example, as illustrated in FIG. 12, the PHY layer of the transmitting apparatus may communicate certain information to the MAC layer which may in turn communicate such information to the RLC layer. Such information may indicate a size or length of the portion of the packet (e.g., the packet segment) that was truncated at the PHY layer. At the RLC layer, the transmitting apparatus may generate a packet segment based on such information. For example, the transmitting apparatus may generate a packet segment (e.g., packet segment 4-2) that includes the truncated bytes from the previous transmission. For instance, as illustrated in FIG. 12, a resegmentation operation at the RLC layer may generate a packet segment 4-2 that includes the truncated bytes from the previously-truncated portion of packet 4. Subsequently, the transmitting apparatus may provide that packet segment 4-2 from the RLC layer to the MAC layer, which may combine it with other packets (e.g., packets 5, 6, 7) for transmission to the receiving apparatus. At the receiving apparatus (e.g., at the RLC layer), some of the packet segments (e.g., packet segments 4-1, 4-2) may be combined together to form an unsegmented packet (e.g., packet 4).

A number of notable distinctions may exist between a resegmentation-allowed operation and a resegmentation-free operation. FIG. 12 illustrates an example of a resegmentation-allowed operation according to some aspects. In comparison, FIG. 11 illustrates an example of resegmentation-free operation according to some aspects. As described above with reference to FIG. 11, the resegmentation-free operation may involve the retransmission of the entire truncated packet (e.g., packet 4-1 illustrated in FIG. 11). However, as described above with reference to FIG. 12, the resegmentation-allowed operation may not necessitate the retransmission of the entire truncated packet (e.g., packet 4 illustrated in FIG. 12). Instead, the resegmentation-allowed operation may involve the retransmission of solely the truncated bytes (e.g., the truncated bytes of packet segment 4-1, as illustrated in FIG. 12). As such, the untruncated bytes (e.g., the portion of packet 4 that does not include the truncated bytes of packet segment 4-1, as illustrated in FIG. 12) do not necessitate retransmission.

Figure 13:
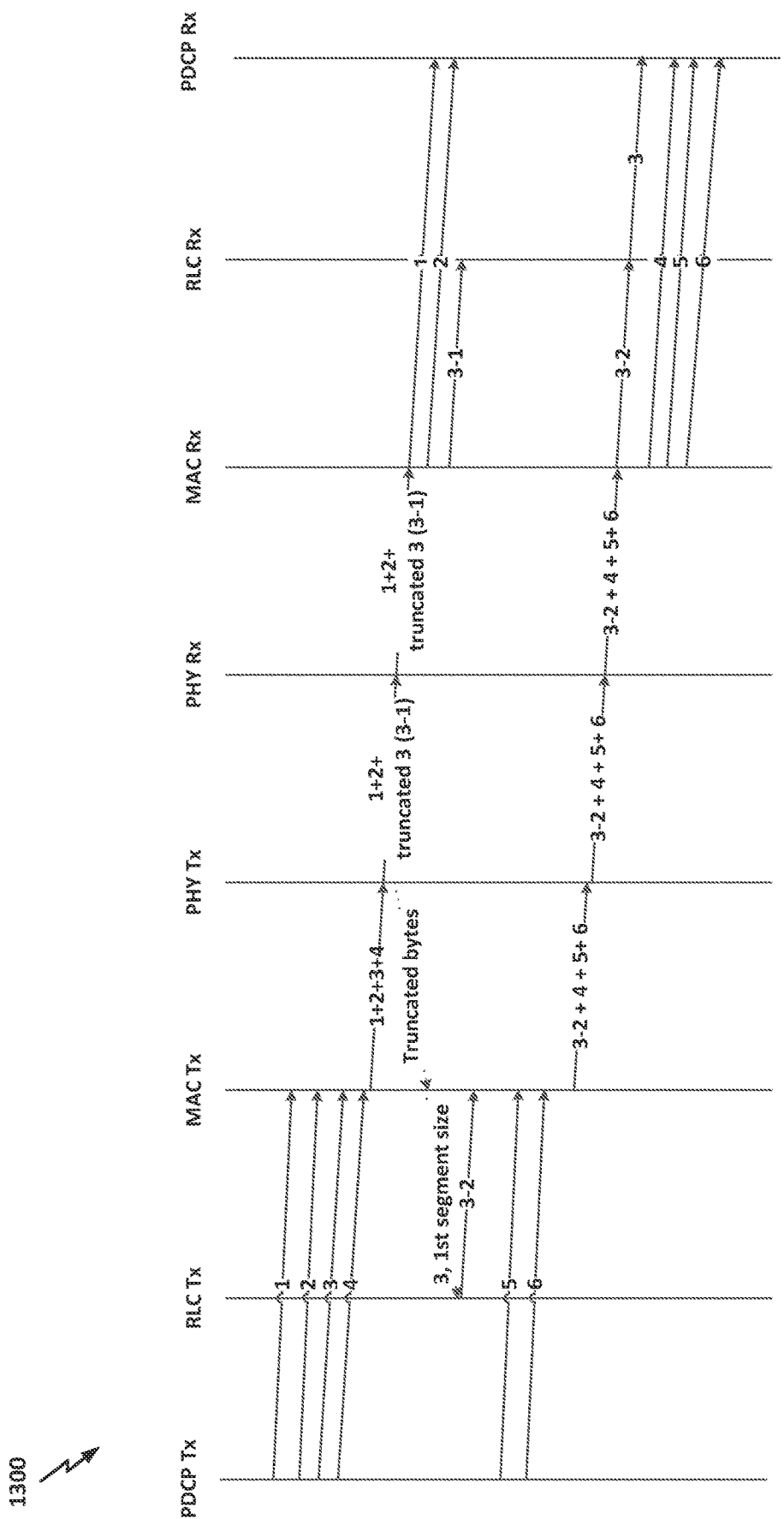

FIG. 13 is a diagram 1300 illustrating yet another example of truncation of a MAC PDU at the PHY layer according to aspects of the present disclosure. In part, the example illustrated in FIG. 13 shows an operation that may sometimes be referred to as a resegmentation-allowed operation. Some aspects illustrated in FIG. 13 are similar to aspects illustrated in FIG. 12. The description of such similar aspects will not be repeated here for the sake of brevity. There are, however, some notable distinctions between the example provided with respect to FIG. 12 relative to the example provided with respect to FIG. 13. In the example provided with respect to FIG. 12, the truncated packet is the last packet in the MAC PDU. In comparison, the example provided with respect to FIG. 13 illustrates that the truncation does not necessarily have to occur at the last packet. For instance, the truncated packet may be the penultimate (e.g., second-to-last) packet in the MAC PDU. In the example illustrated in FIG. 13, a first segment of packet 3 (e.g., not packet 4, as is the case in the example illustrated in FIG. 12) is truncated at the PHY layer. Accordingly, a subsequent transmission may include a MAC PDU that includes the truncated portions (e.g., packet segment 3-1 and packet 4) as well as any other packets (e.g., packets 5, 6) ready for transmission. Although the example illustrated in FIG. 13 shows the truncation occurring at the penultimate (e.g., second-to-last) packet in the MAC PDU, one of ordinary skill in the art will understand that the truncation can occur at any portion or packet of the MAC PDU without necessarily deviating from the scope of the present disclosure.

Figure 14:
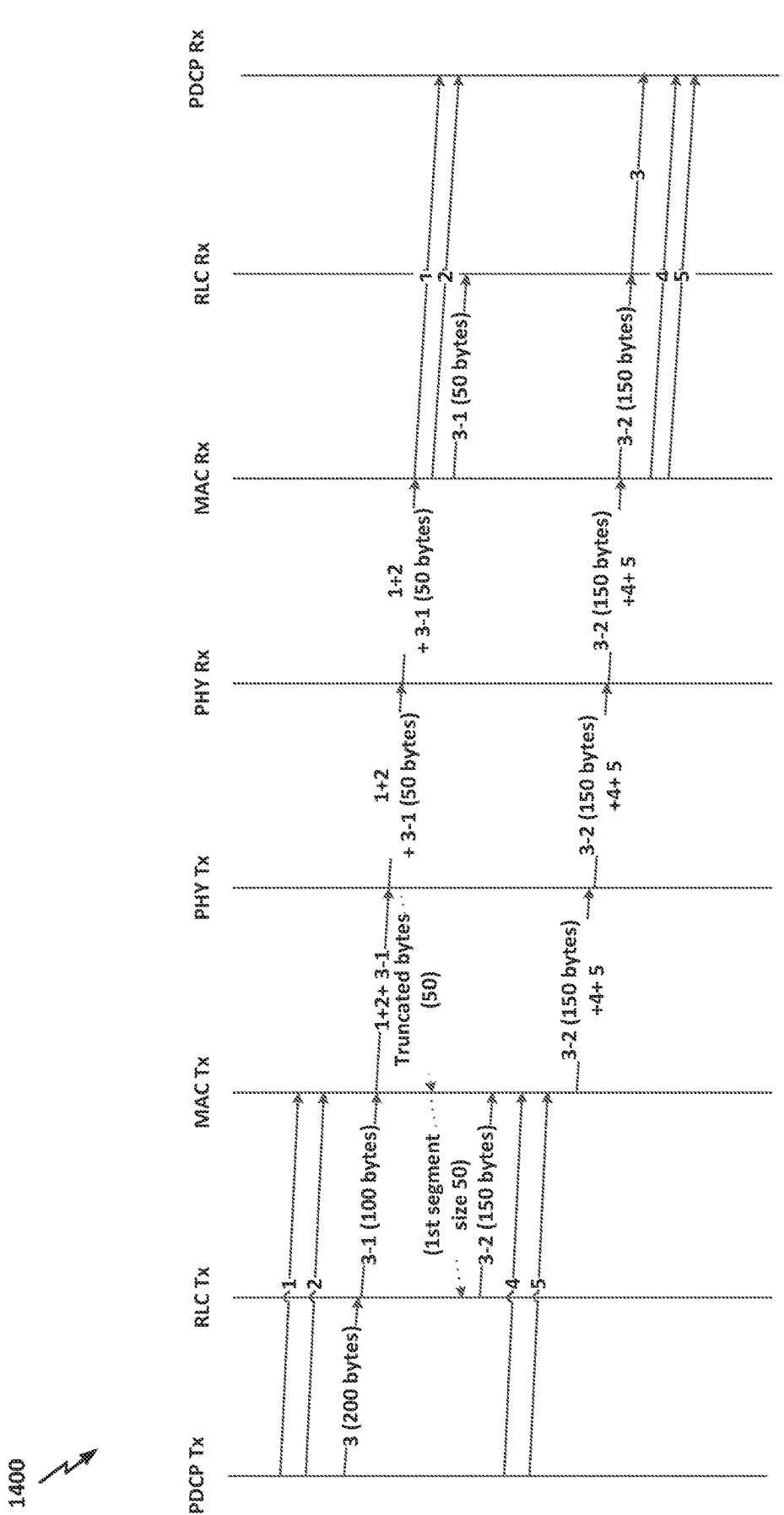

FIG. 14 is a diagram 1400 illustrating yet another example of truncation of a MAC PDU at the PHY layer according to aspects of the present disclosure. In part, the example illustrated in FIG. 14 shows an operation that may sometimes be referred to as a resegmentation-allowed operation. Some aspects illustrated in FIG. 14 are similar to aspects illustrated in FIG. 12. The description of such similar aspects will not be repeated here for the sake of brevity.

Notably, for illustrative purposes, FIG. 14 provides some non-limiting examples of sizes or lengths of various packets in the illustrated MAC PDUs. For example, FIG. 14 indicates that a particular packet (e.g., packet 3) provided from the PDCP layer to the RLC layer of the transmitting apparatus has a particular size (e.g., 200 bytes). At the RLC layer, the transmitting apparatus generates a segment (e.g., packet segment 3-1) that has a smaller size (e.g., 100 bytes) than the unsegmented packet (e.g., packet 3). As illustrated in FIG. 14, the packet segment (e.g., packet segment 3-1) may subsequently be truncated at the PHY layer of the transmitting apparatus (e.g., during the assembly or transmission of the packet) when the entirety of that packet segment (e.g., packet segment 3-1) cannot be accommodated in a single transmission. In the example illustrated in FIG. 14, a portion (e.g., 50 bytes) of that packet segment (e.g., packet segment 3-1) is truncated at the PHY layer. Information pertaining to that truncated portion (e.g., the size or length of the truncated portion) may be communicated from the PHY layer to the MAC layer, which in turn may communicate such information to the RLC layer, as illustrated in FIG. 14. Based on such information, the RLC layer of the transmitting apparatus may subsequently assemble that truncated packet segment (e.g., the truncated 50 bytes from the preceding MAC PDU) in addition to the remaining, untransmitted portion(s) (e.g., the remaining 150 bytes previously received at the RLC layer from the PDCP layer) of the corresponding packet (e.g., packet 3 previously received at the RLC layer from the PDCP layer). Subsequently, the transmitting apparatus may provide that packet (e.g., packet segment 3-2 comprising 150 bytes) from the RLC layer to the MAC layer, which may combine it with other packets (e.g., packets 4, 5) for transmission to the receiving apparatus. At the receiving apparatus (e.g., at the RLC layer), some of the packets (e.g., packet segment 3-1 [50 bytes] and packet segment 3-2 [150 bytes]) may be combined together to form an unsegmented packet (e.g., packet 3 [200 bytes]).

One of ordinary skill in the art will understand that the terms used herein may have various meanings and definitions without necessarily deviating from the scope of the present disclosure. Although additional description maybe provided herein with reference to some terms, such additional description is not intended to necessarily limit the scope, meaning, definition, nor applicability of such terms. As used herein, the term 'packet' may refer to a grouping of data and/or information. One non-limiting example of a packet is a MAC SDU; however, one of ordinary skill in the art will understand that various other grouping of data and/or information may also be characterized as a packet without deviating from the scope of the present disclosure. As used herein, the term 'frame' may refer to a grouping of data and/or information that includes at least one packet, which is described in greater detail herein. One non-limiting example of a frame is a MAC PDU; however, one of ordinary skill in the art will understand that various other groupings of data and/or information that includes at least one packet without deviating from the scope of the present disclosure. As used herein, the term 'configuration' may refer to any parameter, setting, threshold, value, criteria, requirement, condition, prerequisite, trigger, and/or other suitable attribute associated with a determination of whether to segment one or more packets during assembly of a frame. As used herein, the term 'segmentation' (and similar terms) may refer to a process and/or method of separating and/or dividing any portion of data and/or information (e.g., a packet, which is described in greater detail herein) into two or more subportions of such data and/or information, and possibly also adding additional information (e.g., a subheader) to at least one of those subportions. As used herein, the term 'truncation' may refer to a shortening in length and/or reduction in size of any data and/or information (e.g., of a packet and/or a frame, which are described in greater detail herein), thereby resulting in that data and/or information being smaller in size and/or shorter length than it would be otherwise (e.g., without the truncation). As used herein, the term 'padding' may refer to any data and/or information that may be ignored during processing. Padding may have any value and the MAC entity that receives that padding may ignore that padding. If included, padding generally exists at an end portion of a frame (e.g., MAC PDU). When padding exists at an end portion of the frame (e.g., MAC PDU), zero or more padding bytes are allowed. In some instances, padding may be preceded by a padding header. However, when single-byte padding or two-byte padding is utilized, a padding header may not be used (because the minimum header size is two bytes). As used herein, the term 'operation' may refer to one or more processes, methods, steps, actions, inactions, and/or modes implemented in accordance to aspects of the present disclosure.

Figure 15:
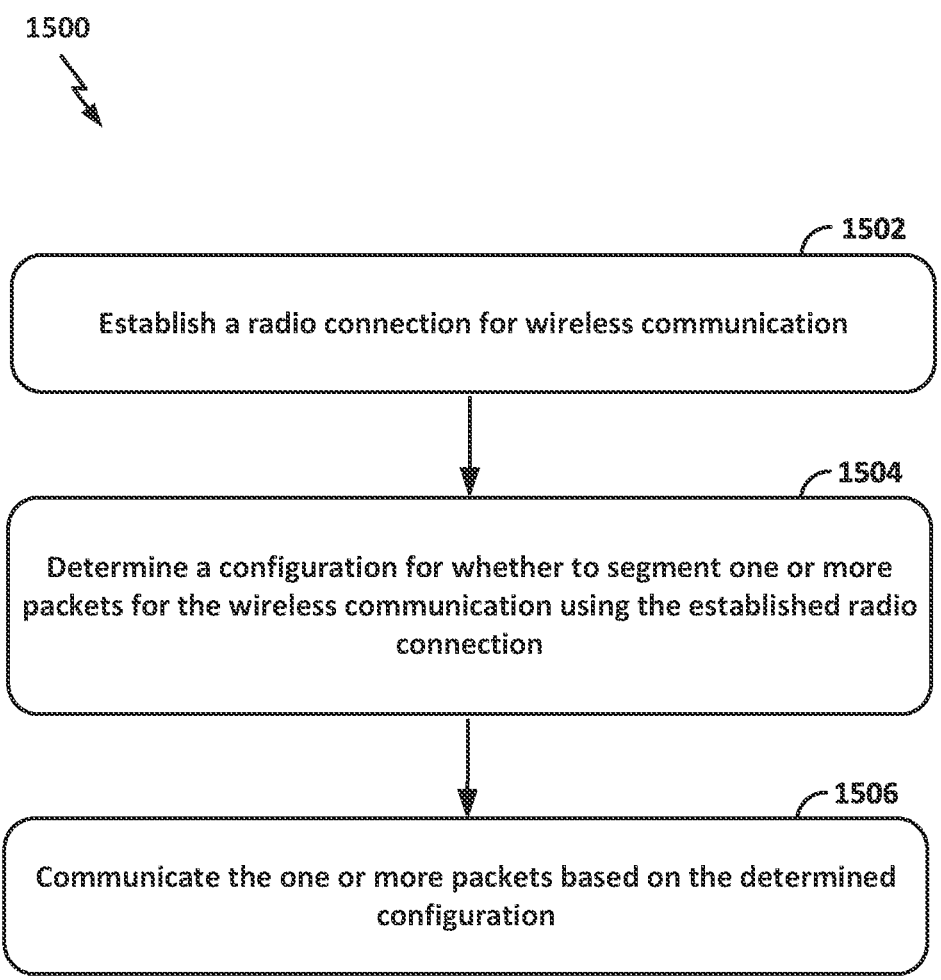
FIGS. 15-18 are diagrams illustrating examples of various methods and/or processes according to aspects of the present disclosure.

FIG. 15 is a diagram 1500 illustrating an example of various methods and/or processes according to aspects of the present disclosure. In some examples, such methods and/or processes may be performed by the scheduling entity 102 and/or the subordinate entity 104. One of ordinary skill in the art will understand that such methods and/or processes may be performed by any other suitable apparatus without deviating from the scope of the present disclosure.

In some configurations, at block 1502, the apparatus may establish a radio connection for wireless communication. For example, the scheduling entity 102 and/or the subordinate entity 104 may utilize various aspects describe above with reference to any one or more of FIGS. 1-5 to establish a radio connection with one another. One of ordinary skill in the art will appreciate that the operation at block 1502 may be optional in some configuration. Without necessarily deviating from the scope of the present disclosure, some aspects described herein may be implemented without performing the operation at block 1502. At block 1504, the apparatus may determine a configuration for whether to segment one or more packets for the wireless communication using the established radio connection. In some configurations, determining the configuration for whether to perform segmentation (e.g., operating according to a segmentation-free mode or a segmentation-allowed mode) may be based on a configuration message, such as the configuration message 502 described in greater detail above with reference to FIG. 5. For example, referring to FIG. 5, the scheduling entity 102 may transmit a configuration (e.g., in a configuration message 502) to the subordinate entity 104. As another example, the subordinate entity 104 may receive an indication (e.g., in the configuration message 502) from the scheduling entity 102. In some configurations, the configurations message 502 may be a MAC CE, which may be transmitted any time that a connection is available. In some configurations, the configuration message 502 may be an RRC connection reconfiguration message, which may be transmitted upon or after establishing the connection. When the configuration message 502 is the RRC connection reconfiguration message, the segmentation-allowed configuration may be applied when the corresponding radio bearer is established (e.g., in the middle of the radio bearer setup procedure). Accordingly, in some configurations, the RRC segmentation-allowed configuration may take place either in the connection establishment or the connection reconfiguration procedures.

At block 1506, the apparatus may communicate the one or more packets based on the determined configuration. In some examples, the configuration includes one or more criteria, and the apparatus (e.g., scheduling entity 102 and/or subordinate entity 104) may be configured to communicate the one or more packets based on the determined configuration. Non-limiting examples of such criteria may include a transport block size threshold, a bandwidth waste percentile threshold, a data rate threshold, a packet size threshold, and/or a packet waste percentile threshold, as described in greater detail herein. Segmentation may be disallowed when the one or more criteria is satisfied, and segmentation may be allowed when the one or more criteria are unsatisfied. In some examples, the configuration is associated with a data flow. As described in greater detail above, a particular data flow may include one or more bearers (e.g., radio bearers), and a particular bearer may be associated with one or more data flows. Two bearers may have different thresholds for determining whether to perform segmentation. For example, one bearer may have a particular threshold value (e.g., x)

while another bearer may have a different threshold value (e.g., y, wherein x≠y). As such, it may be possible that one bearer sometimes performs segmentation while another bearer does not perform segmentation.

Figure 16:
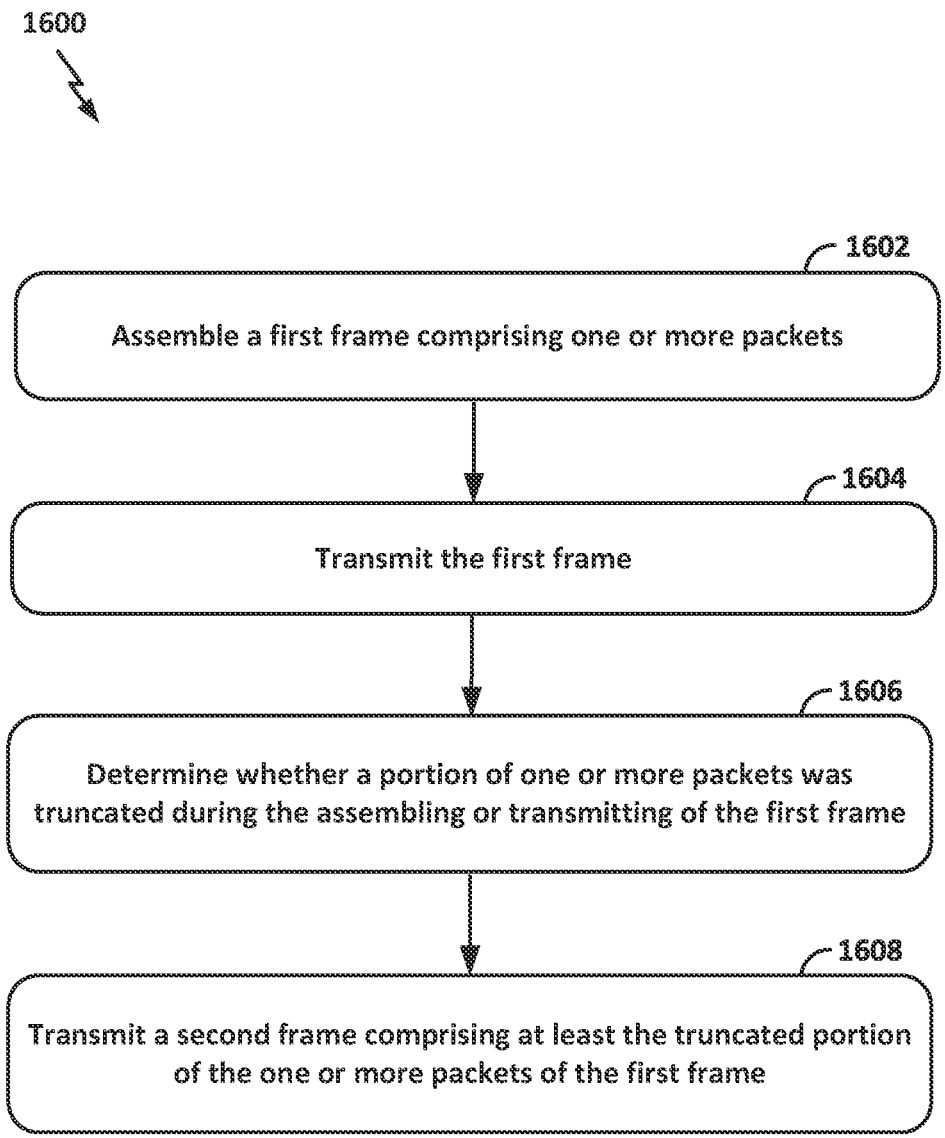

FIG. 16 is a diagram 1600 illustrating an example of various methods and/or processes according to aspects of the present disclosure. In some examples, such methods and/or processes may be performed by the scheduling entity 102 and/or the subordinate entity 104. One of ordinary skill in the art will understand that such methods and/or processes may be performed by any other suitable apparatus without deviating from the scope of the present disclosure.

At block 1602, the apparatus may assemble a first frame comprising one or more packets. For example, the scheduling entity 102 and/or subordinate entity 104 may assemble the MAC PDU illustrated in FIG. 8 during a segmentation-allowed operation. As another example, the scheduling entity 102 and/or subordinate entity 104 may assemble the MAC PDU illustrated in FIG. 7 during a segmentation-free operation. During a segmentation-free operation, the assembly of the first frame may include bypassing one or more operations of an intermediate layer (e.g., the RLC layer or the MAC layer). Such an operation may include the segmentation of one or more upper-layer packets (e.g., packets from a layer higher than the RLC layer or MAC layer). In some examples, the first frame may lack segmentation when one or more criteria are satisfied. Additional description pertaining to such criteria is provided above and therefore will not be repeated. After assembly of the first frame, the apparatus may transmit the frame at block 1604.

At block 1606, the apparatus may determine whether a portion of one or more packets was truncated during the assembling or transmitting of the first frame. For example, the scheduling entity 102 and/or subordinate entity 104 may determine whether a portion of one or more of the MAC SDUs in the MAC PDUs illustrated in any of FIGS. 10-14 was truncated at the PHY layer during the assembly or transmission of that MAC PDU. After determining that a portion of one or more packets was truncated during the assembling or transmitting of the first frame, at block 1608, the apparatus may transmit a second frame comprising at least the truncated portion of the one or more packets of the first frame. For example, as also illustrated in FIGS. 10-14, the scheduling entity 102 and/or subordinate entity 104 may subsequently transmit another MAC PDU that includes at least the portion of the previously-transmitted MAC PDU that was truncated by the PHY layer. In some cases, the entire packet (of which a portion was truncated) is retransmitted, as described above with reference to FIG. 10 (e.g., packet 4) and FIG. 11 (e.g., packet segment 4-1). In some other cases, only the truncated portion of the packet is retransmitted, as described above with reference to FIG. 12 (e.g., only truncated packet segment 4-1 is retransmitted), FIG. 13 (e.g., only truncated packet segment 3-2 and truncated packet 4 are retransmitted), and FIG. 14 (e.g., only the truncated 50 bytes of packet segment 3-1 are retransmitted).

Figure 17:
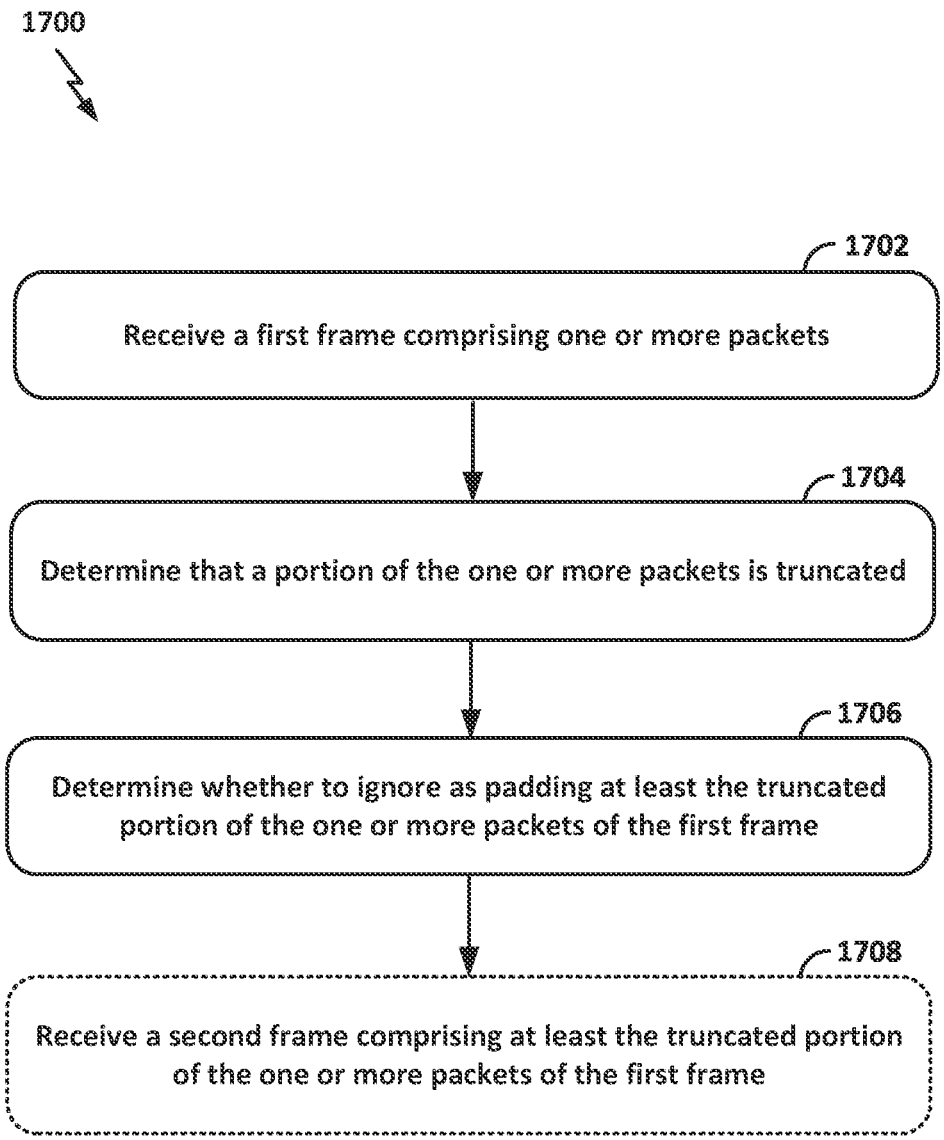

FIG. 17 is a diagram 1700 illustrating an example of various methods and/or processes according to aspects of the present disclosure. In some examples, such methods and/or processes may be performed by the scheduling entity 102 and/or the subordinate entity 104. One of ordinary skill in the art will understand that such methods and/or processes may be performed by any other suitable apparatus without deviating from the scope of the present disclosure.

At block 1702, the apparatus may receive a first frame comprising one or more packets. As an example, the scheduling entity 102 and/or subordinate entity 104 may receive the MAC PDU illustrated in FIG. 8 and/or the MAC PDU illustrated in FIG. 7. At block 1704, the apparatus may determine that a portion of the one or more packets is truncated. For example, the scheduling entity 102 and/or subordinate entity 104 may determine that a portion of one or more of the MAC SDUs in the MAC PDUs illustrated in any of FIGS. 10-14 was truncated. In some examples, the apparatus may determine that a portion of the one or more packets is truncated upon determining that a packet in the first frame has a length that does not match a length indicated in a sub-header of the packet (e.g., in the L field of the MAC subheader described above with reference to Table 2). After determining that a portion of one or more packets was truncated, at block 1706, the apparatus may determine whether to ignore as padding at least the truncated portion of the one or more packets of the first frame. For example, the apparatus may ignore as padding at least the truncated portion of a packet illustrated in FIG. 10 (e.g., truncated packet 4 ignored as padding) and FIG. 11 (e.g., truncated packet segment 4-1 ignored as padding). In some circumstances, the apparatus may determine whether to ignore the truncated portion as padding based on one or more criteria. Non-limiting examples of such criteria may include a transport block size threshold, a bandwidth waste percentile threshold, a data rate threshold, a packet size threshold, and/or a packet waste percentile threshold, as described in greater detail herein.

In some configurations, at block 1708, the apparatus may receive a second frame comprising at least the truncated portion of the one or more packets of the first frame. For example, the apparatus may receive another MAC PDU, as illustrated in FIG. 10 (e.g., truncated packet 4 is subsequently retransmitted in another MAC PDU) and FIG. 11 (e.g., truncated packet segment 4-1 is subsequently retransmitted in another MAC PDU that also contains packet segment 4-2 and packets 5, 6, 7).

Figure 18:
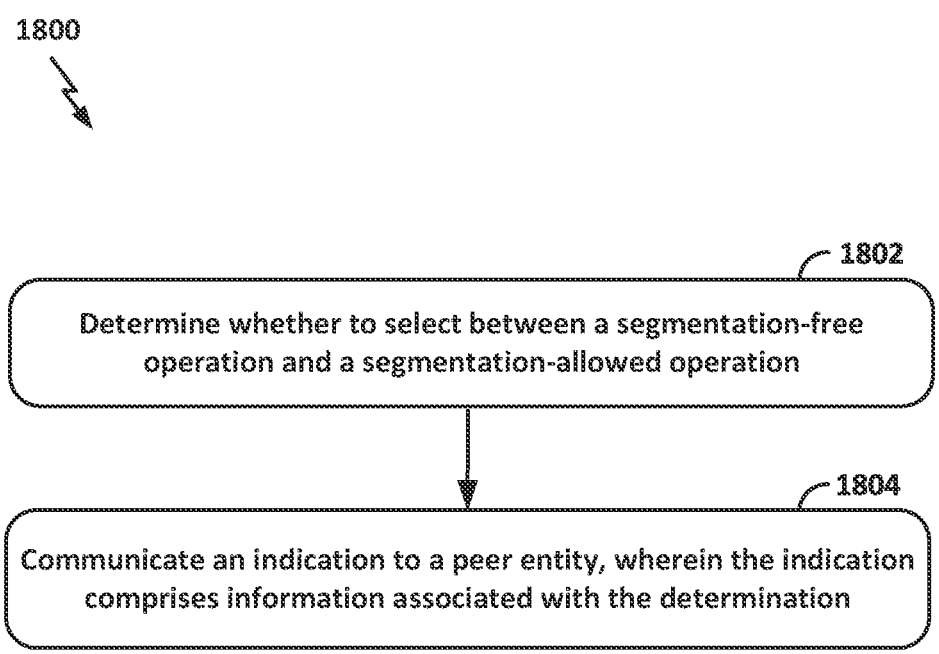

FIG. 18 is a diagram 1800 illustrating an example of various methods and/or processes according to aspects of the present disclosure. In some examples, such methods and/or processes may be performed by the scheduling entity 102 and/or the subordinate entity 104. One of ordinary skill in the art will understand that such methods and/or processes may be performed by any other suitable apparatus without deviating from the scope of the present disclosure.

At block 1802, the apparatus may determine whether to select between a segmentation-free operation and a segmentation-allowed operation. As used herein, the term 'operation' may encompass similar terms, such as mode, mode of operation, modality, function, and process, without deviating from the scope of the present disclosure. Also, as used herein, the term 'determine' (and similar terms, such as 'determining' and 'determination') may be encompass similar terms, such as decide, without deviating from the scope of the present disclosure. Additionally, as used herein, the term 'select' (and similar terms, such as 'selecting' and 'selection') may be encompass similar terms, such as switch, elect, and choose, without deviating from the scope of the present disclosure. In some configurations, the determination (described above) may be based on one or more criteria. As described in greater detail above, such criteria may include a transport block size threshold, a bandwidth waste percentile threshold, a data rate threshold, a packet size threshold, a packet waste percentile threshold, and/or a processing load threshold. In some circumstances, some information relevant to the determination (described above) may be initially available only at another apparatus. For example, information associated with the processing load threshold may be initially available only at the subordinate entity 104. As such, the subordinate entity 104 may communicate (e.g., transmit) such information to the scheduling entity 102.

Subsequently, at block 1804, the apparatus may communicate (e.g., transmit) an indication to a peer entity, wherein the indication includes information associated with the determination. For example, one apparatus (e.g., subordinate entity 104) may transmit an indication to another apparatus (e.g., scheduling entity 102), and the indication may include information indicating the selected mode or operation (e.g., segmentation-free operation or segmentation-allowed operation). In some configurations, the indication may be included in a MAC CE. In some configurations, in-band signaling may be utilized for communicating the MAC CE. In some configurations, the MAC CE may include information for configuring (or de-configuring, re-configuring, etc.) various parameters and/or settings (e.g., one or more criteria and/or thresholds) associated with the determination (described above). For example, an apparatus receiving the indication may configure (or de-configure, re-configure, etc.) various parameters and/or settings (e.g., one or more criteria and/or thresholds) associated with the determination (described above) based on information included in the MAC CE. In some configurations, the determination (described above) may be activated (or deactivated) based on the MAC CE. For example, an apparatus receiving the indication may activate (or deactivate) the determination (described above) based on information included in the MAC CE.

The methods and/or processes described with reference to any one or more of FIGS. 15-18 are provided for illustrative purposes and are not intended to limit the scope of the present disclosure. The methods and/or processes described with reference to any one or more of FIGS. 15-18 may be performed in sequences different from those illustrated therein without deviating from the scope of the present disclosure. Additionally, some or all of the methods and/or processes described with reference to any one or more of FIGS. 15-18 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Figure 19:
FIG. 19 is a diagram illustrating examples of a MAC control element (CE) according to aspects of the present disclosure.
Figure 19:
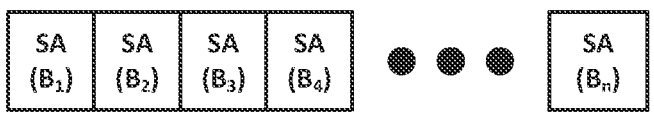
Figure 19:
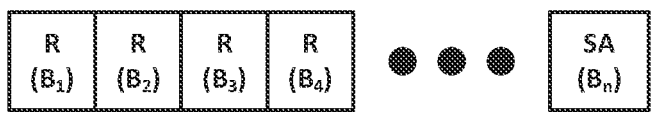

FIG. 19 is a diagram illustrating various examples of a MAC CE according to aspects of the present disclosure. In some examples, the MAC CE may be in the form of a MAC CE subheader 1902. In the example illustrated in FIG. 19, the MAC CE subheader 1902 includes eight (8) bits, wherein the first and second bits correspond to R fields, the third bit corresponds to a Segmentation Allowed (SA) field, and the remaining five bits correspond to an LCID field. The R field and LCID field are described in greater detail above. In some examples, the R field may have a value of zero (0). A value of 11110 in the LCID field may indicate that a subheader contains the SA field. In other words, an apparatus (e.g., scheduling entity 102 and/or subordinate entity 104) that receives a subheader identifies it as a subheader that contains an SA field when the LCID field has a value of 11110. In some configurations, the SA field may indicate whether segmentation is allowed. For example, the SA field indicates that segmentation is allowed when the SA field has a value of one (1), and the SA field indicates that segmentation is disallowed when the SA field has a value of zero (0). For example, when sent by the scheduling entity 102, the SA field may indicate whether segmentation is allowed for UL MAC PDUs.

Based the value of the SA field, the subordinate entity 104 may determine whether to segment a packet for an UL transmission. In some configurations, the SA field may indicate whether segmentation is allowed on the PDU (e.g., the PDU associated with the MAC CE containing that SA field). For example, based on the value of the SA field, the apparatus (e.g., scheduling entity 102 and/or subordinate entity 104) may determine whether to ignore any segments that were received as a result of PHY autonomous truncation. These examples are provided for illustrative purposes and are not intended to necessarily limit the scope of the present disclosure. Additional and/or alternative fields, configurations, arrangements, lengths, and/or sizes may be implemented without necessarily deviating from the scope of the present disclosure.

In some other examples, the MAC CE may be in the form of a MAC CE data field 1904, 1906. In one example illustrated in FIG. 19, the MAC CE data field 1904 includes a plurality of bits ($B_1$-$B_n$), which may sometimes be referred to as a bitmap, a bitstream, or a sequence of bits. The MAC CE data field 1904 may have any plural number of bits without deviating from the scope of the present disclosure. In some examples, the MAC CE data field 1904 may have eight (8) bits, but such examples are not intended to limit the scope of the present disclosure. Each bit in the MAC CE data field 1904 may have a particular value (e.g., zero (0) or one (1)). The value may indicate whether segmentation is allowed. In other words, the value may be used by the apparatus (e.g., scheduling entity 102 and/or subordinate entity 104) to determine whether to perform segmentation. In some examples, a value of one (1) may indicate that segmentation is allowed (e.g., segmentation-allowed operation/mode), and a value of zero (0) may indicate that segmentation is disallowed (e.g., segmentation-free operation/mode).

In some configurations, a particular bit may correspond to a particular logical channel. For instance, each bit may correspond to a different logical channel. For example, a first bit ($B_1$) may indicate whether segmentation is allowed for a first logical channel, and a second bit ($B_2$) may indicate whether segmentation is allowed for a second logical channel. In some other configurations, a particular bit may correspond to a particular logical channel group. For instance, each bit may correspond to a different logical channel group. For example, a first bit ($B_1$) may indicate whether segmentation is allowed for a first logical channel group, and a second bit ($B_2$) may indicate whether segmentation is allowed for a second logical channel group. These examples are provided for illustrative purposes and are not intended to necessarily limit the scope of the present disclosure. Additional and/or alternative fields, configurations, arrangements, lengths, and/or sizes may be implemented without necessarily deviating from the scope of the present disclosure.

In another example illustrated in FIG. 19, the MAC CE data field 1906 includes a plurality of bits ($B_1$-$B_n$), wherein only one of the bits ($B_e$) includes the SA field. In some examples, one or more of the other bits may correspond to R fields, which may have a value of zero (0). The single bit ($B_e$) having the SA field may indicate whether segmentation is allowed for all of the established logical channels at the entity or apparatus (e.g., scheduling entity 102 and/or subordinate entity 104) that received the MAC CE. In other words, a value of one (1) in the SA field may indicate that segmentation is allowed (e.g., segmentation-allowed operation/mode) for all of the established logical channels, and a value of zero (0) in the SA field may indicate that segmentation is disallowed (e.g., segmentation-free operation/mode) for all of the established logical channels. Although the example illustrated in FIG. 19 illustrates that such a bit is sequentially the last bit ($B_e$) of the plurality of bits ($B_1$-$B_n$), one of ordinary skill in the art will understand that such a bit may be in any other order, chronology, sequence, and/or arrangement without necessarily deviating from the scope of the present disclosure. In some examples, the MAC CE data field 1906 may have eight (8) bits, but such examples are not intended to necessarily limit the scope of the present disclosure. These examples are provided for illustrative purposes. Additional and/or alternative fields, configurations, arrangements, lengths, and/or sizes may be implemented without necessarily deviating from the scope of the present disclosure.

Additional description pertaining to the present disclosure is provided in the Appendix filed concurrently herewith. The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. A method of wireless communication, the method comprising:
   transmitting a configuration message comprising a segmentation indicator and an autonomous-truncation-handling indicator, wherein the segmentation indicator is configurable to indicate one of:
     a segmentation-free mode of operation during which segmentation is not allowed for the wireless communication over at least one radio bearer, and
     a segmentation-allowed mode of operation during which selective segmentation is allowed for the wireless communication over the at least one radio bearer;
   assembling a first frame comprising one or more packet segments or packets at a MAC or RLC layer;
   autonomously truncating at least one of the one or more packet segments or packets at the PHY layer to fit the first frame into a single transmission;
   transmitting the first frame, the transmitted first frame comprising the at least one autonomously-truncated packet segment or packet; and
   transmitting a second frame comprising at least a truncated portion of the at least one autonomously-truncated packet segment or packet of the first frame in accordance with the autonomous-truncation-handling indicator of the configuration message;
   wherein the autonomous-truncation-handling indicator is configurable to indicate one of:
     resegmentation-allowed handling, during which a receiver of the first frame retains the at least one autonomously-truncated packet segment or packet; and
     resegmentation-free handling, during which the receiver discards the at least one autonomously-truncated packet segment or packet.

2. The method of claim 1, wherein the segmentation indicator is based on one or more criteria.

3. The method of claim 2, wherein the one or more criteria comprise at least one of a bandwidth waste percentile threshold, a data rate threshold, a packet waste percentile threshold, or a processing load threshold.

4. The method of claim 2, wherein the one or more criteria are based on information received in at least one of a radio resource control (RRC) message or a medium access control (MAC) control element (CE).

5. The method of claim 1, wherein each packet comprises a medium access control (MAC) service data unit (SDU), and wherein each frame comprises a MAC protocol data unit (PDU).

6. A method of wireless communication, the method comprising:
   receiving a configuration message comprising a segmentation indicator and an autonomous-truncation-handling indicator;
   receiving a first frame comprising at least one autonomously-truncated packet segment or packet, and either:
     discarding the at least one autonomously-truncated packet segment or packet of the first frame in accordance with the autonomous-truncation-handling indicator indicating a resegmentation-free handling; or
     retaining the at least one autonomously-truncated packet segment or packet of the first frame in accordance with the autonomous-truncation-handling indicator indicating a resegmentation-allowed handling.

7. The method of claim 6, further comprising comparing a received length of a packet segment or packet in the first frame to a length indicated in a sub-header of the packet segment or packet.

8. The method of claim 6, wherein the segmentation indicator is based on one or more criteria.

9. The method of claim 8, wherein the one or more criteria comprise at least one of a bandwidth waste percentile threshold, a data rate threshold, a packet waste percentile threshold, or a processing load threshold.

10. The method of claim 8, wherein the one or more criteria are based on information received in at least one of a radio resource control (RRC) message or a medium access control (MAC) control element (CE).

11. The method of claim 6, wherein each packet comprises a medium access control (MAC) service data unit (SDU), and wherein each frame comprises a MAC protocol data unit (PDU).

12. An apparatus configured for wireless communication, the apparatus comprising:
one or more memories; and
one or more processors coupled to the one or more memories, the one or more processors being configured to:
transmit a configuration message comprising a segmentation indicator and an autonomous-truncation-handling indicator, wherein the segmentation indicator is configurable to indicate one of:
a segmentation-free mode of operation during which segmentation is not allowed for the wireless communication over at least one radio bearer, and
a segmentation-allowed mode of operation during which selective segmentation is allowed for the wireless communication over the at least one radio bearer;
autonomously truncate at least one of the one or more packet segments or packets at the PHY layer to fit the first frame into a single transmission;
transmit the first, the transmitted first frame comprising the at least one autonomously-truncated packet segment or packet; and
transmit a second frame comprising at least a truncated portion of the at least one autonomously-truncated packet segment or packet of the first frame in accordance with the autonomous-truncation-handling indicator of the configuration message;
wherein the autonomous-truncation-handling indicator is configurable to indicate one of:
resegmentation-allowed handling, during which a receiver of the first frame retains the at least one autonomously-truncated packet segment or packet; and
resegmentation-free handling, during which the receiver discards the at least one autonomously-truncated packet segment or packet.

13. The apparatus of claim 12, wherein the segmentation indicator is based on one or more criteria.

14. The apparatus of claim 13, wherein the one or more criteria comprise at least one of a bandwidth waste percentile threshold, a data rate threshold, a packet waste percentile threshold, or a processing load threshold.

15. The apparatus of claim 13, wherein the one or more criteria are based on information received in at least one of a radio resource control (RRC) message or a medium access control (MAC) control element (CE).

16. The apparatus of claim 12, wherein each packet comprises a medium access control (MAC) service data unit (SDU), and wherein each frame comprises a MAC protocol data unit (PDU).

17. An apparatus configured for wireless communication, the apparatus comprising:
one or more memories; and
one or more processors coupled to the one or more memories, the one or more processors being configured to:
receive a configuration message comprising a segmentation indicator and an autonomous-truncation-handling indicator;
receive a first frame comprising at least one autonomously-truncated packet segment or packet, and either:
discard the at least one autonomously-truncated packet segment or packet of the first frame in accordance with the autonomous-truncation-handling indicator indicating a resegmentation-free handling; or
retain the at least one autonomously-truncated packet segment or packet of the first frame in accordance with the autonomous-truncation-handling indicator indicating a resegmentation-allowed handling.

18. The apparatus of claim 17, wherein the one or more processors are further configured to:
compare a received length of a packet segment or packet in the first frame to a length indicated in a sub-header of the or packet segment or packet.

19. The apparatus of claim 17, wherein the segmentation indicator is based on one or more criteria.

20. The apparatus of claim 19, wherein the one or more criteria comprise at least one of a bandwidth waste percentile threshold, a data rate threshold, a packet waste percentile threshold, or a processing load threshold.

21. The apparatus of claim 19, wherein the one or more criteria are based on information received in at least one of a radio resource control (RRC) message or a medium access control (MAC) control element (CE).

22. The apparatus of claim 17, wherein each packet comprises a medium access control (MAC) service data unit (SDU), and wherein each frame comprises a MAC protocol data unit (PDU).

23. The method of claim 1, further comprising providing information from a PHY layer of the transmitting entity pertaining to the autonomous truncation of the at least one of the one or more packet segments or packets to a MAC layer of the transmitting entity.

24. The method of claim 23, further comprising assembling the second frame utilizing the information pertaining to the autonomous truncation.

25. The method of claim 1, further comprising receiving the assembled first frame at the PHY layer.

* * * * *